United States Patent
Ishikawa et al.

[11] Patent Number: 6,140,450
[45] Date of Patent: Oct. 31, 2000

[54] MODIFIED POLYSILOXANES, RUBBER COMPOSITIONS AND TIRE TREAD RUBBER COMPOSITIONS CONTAINING THE SAME, AND REACTIVE PLASTICIZER

[75] Inventors: Kazunori Ishikawa; Fumito Yatsuyanagi, both of Hiratsuka, Japan

[73] Assignee: The Yokohama Rubber Co., Ltd., Tokyo, Japan

[21] Appl. No.: 09/125,818

[22] PCT Filed: Dec. 26, 1997

[86] PCT No.: PCT/JP97/04899

§ 371 Date: Aug. 26, 1998

§ 102(e) Date: Aug. 26, 1998

[87] PCT Pub. No.: WO98/29473

PCT Pub. Date: Jul. 9, 1998

[30] Foreign Application Priority Data

| Dec. 27, 1996 | [JP] | Japan | 8-349658 |
| Apr. 10, 1997 | [JP] | Japan | 9-092316 |
| Jul. 18, 1997 | [JP] | Japan | 9-194313 |
| Aug. 7, 1997 | [JP] | Japan | 9-213359 |
| Oct. 6, 1997 | [JP] | Japan | 9-272826 |

[51] Int. Cl.$^7$ ................................. C08G 77/04
[52] U.S. Cl. ...................... 528/25; 525/100; 525/105; 525/106; 524/506; 524/269; 524/496; 524/495
[58] Field of Search ............... 528/25; 525/100, 525/105, 106; 524/269, 496, 495, 506

[56] References Cited

U.S. PATENT DOCUMENTS

| 4,904,732 | 2/1990 | Iwahara et al. | 525/100 |
| 5,666,245 | 9/1997 | Kennedy et al. | 525/479 |
| 5,777,059 | 7/1998 | Datz-Siegel et al. | 528/14 |

FOREIGN PATENT DOCUMENTS

| 0 784 072 A1 | 7/1997 | European Pat. Off. |
| 0 861 872 A1 | 9/1998 | European Pat. Off. |
| 0 872 515 A1 | 10/1998 | European Pat. Off. |
| 60-213506 | 10/1985 | Japan |
| 61-200135 | 9/1986 | Japan |
| 61-200136 | 9/1986 | Japan |
| 5-1177 | 1/1993 | Japan |
| 6-116443 | 4/1994 | Japan |
| 7-285829 | 10/1995 | Japan |
| 10-1543 | 1/1998 | Japan |
| WO 96/16125 | 5/1996 | WIPO |

OTHER PUBLICATIONS

Patent Abstract of Japanese Pub. No. 05043696, *Reactive Organopolysiloxane*, Shoji Hiroaki, Nippon Unicar Co. Ltd., published Feb. 23, 1993.

Patent Abstract of Japanese Pub. No. 03047841, *Alkoxysilylalkyl Group–Containing Organopolysiloxane*, Ona Isao, Toray Dow Corning Silicone Co. Ltd., published Feb. 28, 1991.

Patent Abstract of Japanese Pub. No. 62225533, *Organopolysiloxane Modified with Alkoxysilylalkyl Polyoxyalkylene*, Taki Yoichiro, Toray Silicone Co. Ltd., published Oct. 3, 1987.

Patent Abstract of Japanese Pub. No. 10001543, *Acyloxypolysiloxane Derivative and Its Production*, Hosoda Hiroyuki, Yokohama Rubber Co. Ltd.: The, published Jan. 6, 1998.

*Primary Examiner*—Margaret G. Moore
*Attorney, Agent, or Firm*—Arent Fox Kintner Plotkin & Kahn, PLLC

[57] ABSTRACT

A polysiloxane having a siloxane structure of the following formulas (1) and (2):

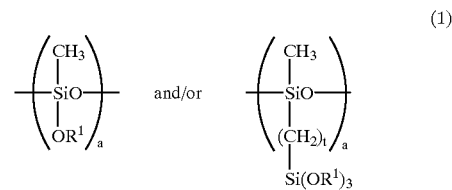

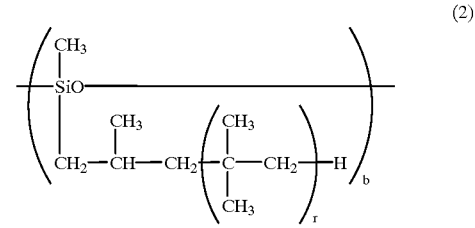

wherein, $R^1$ is a $C_1$ to $C_6$ alkyl group or $C_1$ to $C_{21}$ acyl group, a is 1 to 200, b is 1 to 200, t is 2 or 3 and r is 1 to 100, and a rubber composition containing the same.

16 Claims, No Drawings

MODIFIED POLYSILOXANES, RUBBER COMPOSITIONS AND TIRE TREAD RUBBER COMPOSITIONS CONTAINING THE SAME, AND REACTIVE PLASTICIZER

TECHNICAL FIELD

The present invention relates to a modified polysiloxane and to a rubber composition and a tire tread rubber composition using the same. More particularly, it relates to a modified polysiloxane which is free from migration from rubber due to the formulation of the modified polysiloxane in a rubber composition and, as compared with ordinary plasticizers, gives a low modulus, improves the processability of a silica formulated rubber, reduces the temperature dependency of the hardness, is superior in the tans balance, and enables an improvement in the grip on ice/snow, abrasion resistance, etc. and to a rubber composition and a tire tread rubber composition using the same.

Further, the present invention relates to a non-migratory reactive plasticizer used in a rubber or a resin composition, more particularly to a siloxane-based reactive plasticizer suitable for use in a rubber or a resin composition containing silica, clay, mica, kaolin, active clay, or other silicon-containing fillers.

BACKGROUND ART

In general, plasticizers are used for many products comprising rubber compositions. These migrate with the passage of time, and therefore, there has been the problem of changes in the performance of the product with the elapse of time. To deal with this problem, it is known to add liquid IR or BR, but these are not necessarily covulcanized and considerably migrate.

Further, since these are diene polymers, the heat aging resistance etc. deteriorates.

Further, there is the technique of adding a plasticizer for the purpose of reducing the hardness of the rubber at a low temperature (see Japanese Unexamined Patent Publication (Kokai) No. 6-116443), but the plasticizer per se has a high volatility and migration property, and therefore, there is a large change with time and the performance on ice is considerably decreased. Further, if a large amount of the plasticizer is formulated, there is a problem that the abrasion resistance is also decreased.

Further, there is the technique of formulating a butyl rubber or a halogenated butyl rubber into a tire tread rubber composition so as to improve the grip performance on ice (see Japanese Unexamined Patent Publication (Kokai) No. 60-213506 and Japanese Unexamined Patent Publication (Kokai) No. 5-001177), but there is a defect that the abrasion resistance is conversely decreased.

Further, many plasticizers are used for various types of rubber and resins. Among these, since ester-based plasticizers are in particular superior in compatibility with rubber and resins, they have been used conventionally in the past. However, these ester compounds do not react with rubber or resins or with fillers and migrate to the outside with the elapse of time, and therefore, there was the problem that they caused the physical properties of the rubber or resins to fall with the passage of time. Further, reactive plasticizers for epoxy resins are well known, but almost no reactive plasticizers for other resins or rubber are known.

DISCLOSURE OF THE INVENTION

Accordingly, an object of the present invention is to provide a specific polysiloxane modified with a liquid polymer which, when formulated in most rubber compositions, particularly rubber compositions containing carbon black and/or silica, does not migrate and also gives a cured rubber which is flexible even at low temperatures and improves the processability when unvulcanized.

Another object of the present invention is to provide a tire tread rubber composition which, by formulating a modified polysiloxane in a tire tread rubber composition, can maintain a low modulus, can reduce the temperature dependency of the hardness, is superior in the tans balance, and is improved in the gripping force on ice/snow, the abrasion resistance, etc.

Still another object of the present invention is to provide a reactive plasticizer for preventing deterioration in the physical properties of a rubber or a resin composition with the passage of time.

According to the present invention, as the specific polysiloxane modified with a liquid polymer, there are provided a polysiloxane having the siloxane structure of the following formulas (1) and (2) and a polysiloxane having the siloxane structure of the following formulas (1) and (3):

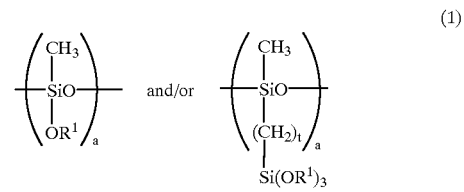

(1)

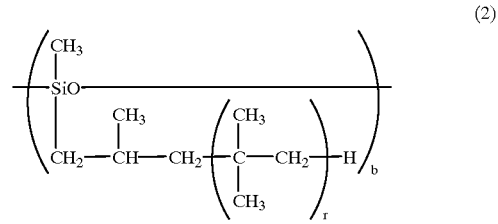

(2)

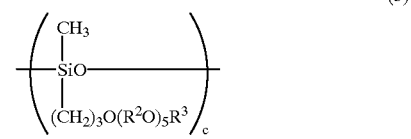

(3)

wherein, $R^1$ is a $C_1$ to $C_6$ alkyl group or $C_1$ to $C_{21}$ acyl group, $R^2$ is a $C_2$ to $C_4$ alkylene group, $R^3$ is a monovalent hydrocarbon group, a is 1 to 200, b is 1 to 200, c is 1 to 200, t is 2 or 3, r is 1 to 100, and s is 1 to 100.

Further, according to the present invention, there is provided a rubber composition comprising 100 parts by weight of rubber and 1 to 50 parts by weight of a polysiloxane having a siloxane structure of the above formulas (1) and (2) and/or a polysiloxane having a siloxane structure of the above formulas (1) and (3) formulated therein, and particularly said rubber composition further comprising silica formulated therein.

Further, according to the present invention, there is provided a tire tread rubber composition comprising 100 parts by weight of at least one rubber selected from the group consisting of natural rubber, polybutadiene rubber, styrene-butadiene copolymer rubber, and polyisoprene rubber and 45 to 80 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g or other fillers, 5 to 50 parts by weight of a polysiloxane having a siloxane structure of the above formulas (1) and (2) and/or a polysiloxane having a siloxane structure of the above formulas (1) and (3), and a softening agent and other rubber chemicals are formulated therein.

Further, according to the present invention, there is provided a tire tread rubber composition comprising 100 parts by weight of at least one rubber selected from the group consisting of natural rubber, polybutadiene rubber, styrene-butadiene copolymer rubber, and polyisoprene rubber in which 20 to 60 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g, 5 to 50 parts by weight of at least one filler selected from the group consisting silicas having a specific surface area by nitrogen adsorption ($N_2SA$) of 80 to 300 $m^2/g$ and a dibutyl phthalate oil absorption (DBP) of 100 to 300 ml/100 g, 5 to 50 parts by weight of a polysiloxane having a siloxane structure of the above formulas (1) and (2) and/or a polysiloxane having a siloxane structure of the above formulas (1) and (3), and a softening agent and other rubber chemicals are formulated.

Further, according to the present invention, there is provided a tire tread rubber composition comprising 100 parts by weight of at least one rubber selected from the group consisting of styrene-butadiene copolymer rubbers having a styrene content in the range of at least 10% by weight and 60 to 100 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 70 to 140 ml/100 g or other fillers, 5 to 50 parts by weight of a polysiloxane having a siloxane structure of the above formulas (1) and (2) and/or a polysiloxane having a siloxane structure of the above formulas (1) and (3), and a softening agent and other rubber chemicals formulated therein.

Further, according to the present invention, there is provided a tire tread rubber composition comprising 100 parts by weight of at least one rubber selected from the group consisting of styrene-butadiene copolymer rubbers having a styrene content in the range of at least 10 wt %, in which 20 to 80 parts by weight of at least one filler selected from the group consisting of carbon blacks having a specific surface area by nitrogen adsorption ($N_2SA$) of 50 to 170 $m^2/g$ and a dibutyl phthalate oil adsorption (DBP) of 70 to 140 ml/100 g, 5 to 50 parts by weight of at least one filler selected from the group consisting of silicas having a specific surface area by nitrogen adsorption ($N_2SA$) of 80 to 300 $m^2/g$ and a dibutyl phthalate oil absorption (DBP) of 100 to 300 ml/100 g, 5 to 50 parts by weight of a polysiloxane having a siloxane structure of the above formulas (1) and (2) and/or a polysiloxane having a siloxane structure of the above formulas (1) and (3), and a softening agent and other rubber chemicals are formulated.

Further, according to the present invention, there is provided a rubber composition comprising 100 parts by weight of at least one rubber selected from the group consisting of natural rubber, polybutadiene rubber, styrene-butadiene copolymer rubber, and polyisoprene rubber in which 45 to 80 parts by weight of at least one filler selected from the group consisting of carbon black having a specific surface area by nitrogen adsorption ($N_2SA$) of 50 to 170 $m^2/g$ and a dibutyl phthalate oil absorption (DBP) of 60 to 140 ml/100 g or other fillers, 2 to 150 parts by weight of (a) a silica-containing polysiloxane master batch comprising 100 parts by weight of at least one ingredient selected from the group consisting of polysiloxanes having a siloxane structure of the above formulas (1) to (3) containing 30 to 200 parts by weight of at least one filler selected from the group consisting of silicas having a specific surface area by nitrogen adsorption ($N_2SA$) of 80 to 300 $m^2/g$ and a dibutyl phthalate oil absorption (DBP) of 100 to 300 ml/100 g, (b) a carbon black-containing polysiloxane master batch comprising 100 parts by weight of at least one ingredient selected from the group consisting of polysiloxanes having a siloxane structure of the above formulas (1) to (3) containing 30 to 200 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g or other fillers, or (c) a silica- and carbon black-containing polysiloxane master batch comprising a mixture comprising 100 parts by weight of at least one ingredient selected from the group consisting of polysiloxanes having a siloxane structure of the above formulas (1) to (3) containing 1 to 199 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g or other fillers and 1 to 199 parts by weight of at least one filler selected from the group consisting of silicas having a specific surface area by nitrogen adsorption ($N_2SA$) of 80 to 300 $m^2/g$ and a dibutyl phthalate oil absorption (DBP) of 100 to 300 ml/100 g, wherein the sum of the two is 30 to 200 parts by weight, and a softening agent and other rubber chemicals are formulated.

Further, according to the present invention, there is provided a rubber composition comprising of 100 parts by weight of at least one rubber selected from the group consisting of styrene-butadiene copolymers having a styrene content of at least 10% by weight in which 60 to 100 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 70 to 140 ml/100 g or other fillers, 2 to 150 parts by weight of (a) a silica-containing polysiloxane master batch comprising 100 parts by weight of at least one ingredient selected from the group consisting of polysiloxanes having a siloxane structure of the above formulas (1) to (3) containing 30 to 200 parts by weight of at least one filler selected from silicas having a specific surface area by nitrogen adsorption ($N_2SA$) of 80 to 300 $m^2/g$ and a dibutyl phthalate oil absorption (DBP) of 100 to 300 ml/100 g, (b) a carbon black-containing polysiloxane master batch comprising 100 parts by weight of at least one ingredient selected from the group consisting of polysiloxanes having a siloxane structure of the above formulas (1) to (3) containing 30 to 200 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g or other fillers, or (c) a silica- and carbon black-containing polysiloxane master batch comprising a mixture comprising 100 parts by weight of at least one ingredient selected from the group consisting of polysiloxanes having a siloxane structure of the above formulas (1) to (3) containing 1 to 199 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g or other fillers and 1 to 199 parts by weight of at least one filler selected from the group consisting of silicas having a specific surface area by nitrogen adsorption ($N_2SA$) of 80 to 300 $m^2/g$ and a dibutyl phthalate oil absorption (DBP) of 100 to 300 ml/100 g, wherein the sum of the two is 30 to 200 parts by weight, and a softening agent and other rubber chemicals are formulated.

Further, according to the present invention, there is provided a siloxane-based reactive plasticizer having, as a plasticizer ingredient, at least 50 wt % of an organic group containing an ester group or an aliphatic or aromatic hydrocarbon group and having as a reactive group in a molecule at least one of an alkoxysilyl group and an acyloxysilyl group.

Further, according to a preferable embodiment of the present invention, there is provided a siloxane-based plasticizer, that is, a polysiloxane having in a molecule at least one siloxane unit of the following formula (I) and formula (II):

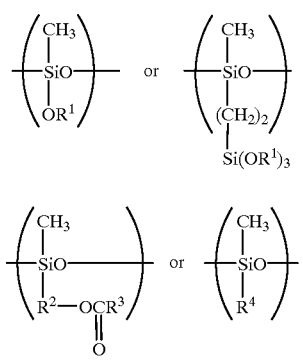

wherein, $R^1$ is a $C_1$ to $C_6$ alkyl group and/or $C_1$ to $C_{21}$ acyl group, $R^2$ is a $C_2$ or $C_3$ alkylene group, $R^3$ is a $C_5$ to $C_{21}$ hydrocarbon group, and $R^4$ is a $C_6$ to $C_{20}$ hydrocarbon group.

BEST MODE FOR WORKING THE INVENTION

The constitution and working-effect of the present invention will be explained below.

As the polyisobutylene-containing alkoxy or acyloxypolysiloxane of the present invention, the following compounds A to C may be illustrated:

A:

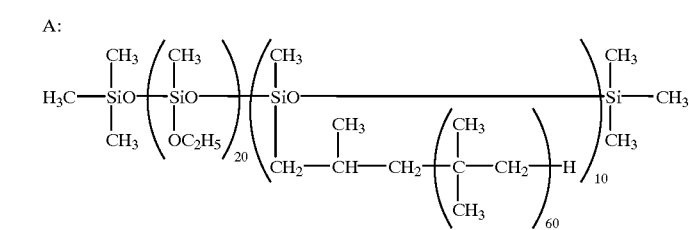

B:

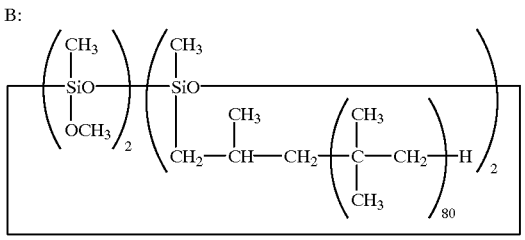

C:

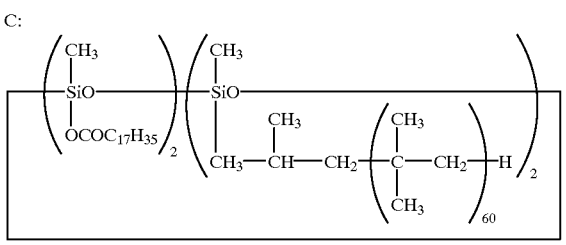

B:

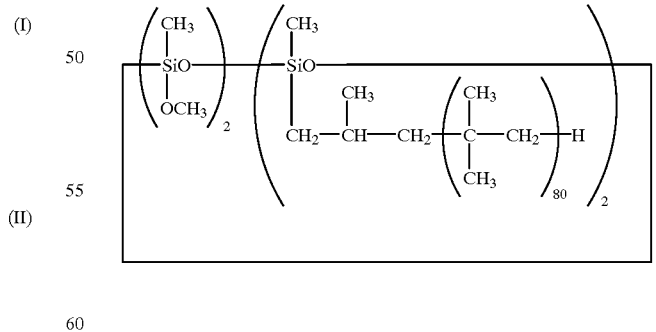

These polysiloxanes are, for example, synthesized as follows: The synthesis can be carried out by reacting a polysiloxane having an Si—H group with an alcohol or a carboxylic acid, and then reacting a polyisobutylene having an alkenyl group at an end with this reaction product. As a catalyst of this reaction, a transition metal catalyst of the Group VIII of the Periodic Table can be used. In particular, it is preferable to use a platinum chloride, an olefin complex, etc.

As the polysiloxane having an Si—H group, the following containing dimethyl siloxane units may be illustrated:

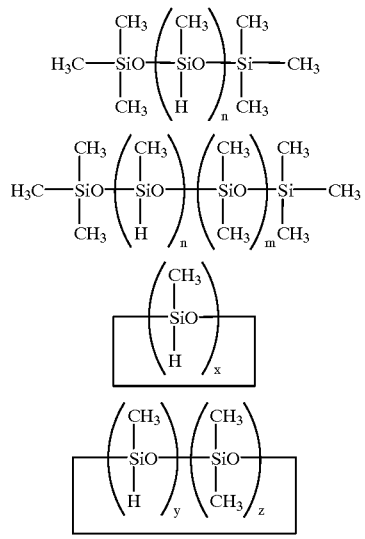

In the formulas, n is not particularly limited, but, industrially, there is no product with single molecular-weight distribution of n's. Polysiloxanes with a certain width of molecular-weight distribution relating to n's, that is, in general with n's of not more than 100, particularly around 40, are commercially available. Further, m is not particularly limited, but polysiloxanes with m's of 1 to 100 can be easily obtained. Polysiloxanes with x's of 3 to 6, particularly 4, are available, while polysiloxanes with y's and z's of 1 or more and with totals of y+z of not more than 6 are known.

These polysiloxane can be used equivalently for the purpose of the present invention and may be used alone or as mixtures.

As the alcohol, methanol, ethanol, propanol, butanol, pentanol, hexanol, etc. may be illustrated. In particular, methanol, ethanol, and propanol may be preferably used.

As the carboxylic acid, for performance purposes, saturated, unsaturated, aliphatic, and aromatic carboxylic acids from formic acid having one carbon to behenic acid having 22 carbon atoms may be used, but from the viewpoint of odor and price, palmitic acid, stearic acid, or their mixtures are preferably used.

As the polyisobutylene having an alkenyl group at its end, the following may be used:

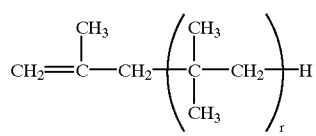

When the r in the formula is 1 to 100, the polymeric compound becomes easy to handle viscosity-wise.

As the method of synthesis of these polysiloxanes, first, a polysiloxane having an Si—H group may be reacted with an alcohol or carboxylic acid, then reacted with an alkenyl group-terminated polyisobutylene or an alkenyl group-containing silicon may be reacted with a polysiloxane having an Si—H group, then reacted with an alkenyl group-terminated polyisobutylene or these may be reacted simultaneously.

To achieve the objects of the present invention, other siloxane units may also be contained, but in this case, it is necessary to include at least 40 wt % of polyisobutylene.

Further, as the polyether containing alkoxy or acyloxy-polysiloxane of the present invention, the following a compounds D to E may be exemplified:

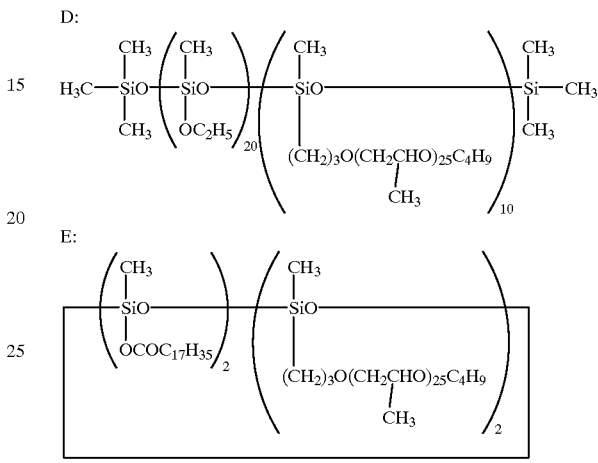

These polysiloxanes may be synthesized in the same way as the above polyisobutylene-containing alkoxy or acyloxy polysiloxane. That is, they may be synthesized by reacting the above polysiloxane having an Si—H group with an alcohol or carboxylic acid and the following alkenyl terminated polyether, or by reacting the above polysiloxane having an Si—H group with an alkenyl group-containing silicon and alkenyl terminated polyether. As the catalyst of this reaction, a Group VIII transition metal catalyst, in particular a platinum chloride, an olefin complex, etc., may be also preferably used.

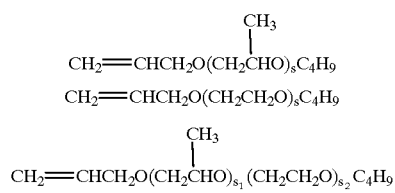

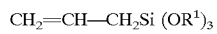

Wherein, s is 1 to 100, $s_1$ is 1 to 100, $s_2$ is 1 to 100, and $s_1+s_2=s$. Further, $R^1$ is a $C_1$ to $C_6$ alkyl group or $C_1$ to $C_{21}$ acyl group.

The above alkoxyl or acyloxysiloxane unit can combine with silica if at least one unit is present in a molecule, and, as a result, the polysiloxane is no longer bleeding out. However, the presence of at least 2 units are particularly preferable.

To achieve the objects of the present invention, other siloxane units may also be contained. In this case, the above polyether must be contained in an amount of at least 40% by weight.

The polyisobutylene-containing alkoxy or acyloxy polysiloxane and the above polyether-containing alkoxy or acyloxy polysiloxane of the present invention may be used for a rubber composition comprised of various formulations. This is used in an amount of 1 to 50 parts by weight, preferably an amount of 5 to 30 parts by weight, per 100 parts by weight of rubber. If the amount of the polysiloxane formulated is too small, the desired effect cannot be obtained, while if too large, problems arise in the performance of the rubber.

The rubber component formulated into the rubber composition according to the present invention is a cross-linkable rubber component alone or in a mixture of two or more types. As the cross-linkable rubber, any rubber may be used. For example, natural rubber (NR), various butadiene rubbers (BR), various styrene-butadiene copolymer rubbers (SBR), polyisoprene rubber (IR), butyl rubber (IIR), acrylonitrile-butadiene rubber, chloroprene rubber, ethylene-propylene copolymer rubbers, ethylene-propylene-diene copolymer rubbers, styrene-isoprene copolymer rubber, styrene-isoprene-butadiene copolymer rubber, isoprene-butadiene copolymer rubber, chlorosulfonated polyethylene, acryl rubber, epichlorohydrin rubber, polysulfide rubber, silicone rubber, fluororubber, urethane rubber, and the like may be used. When using a blend of the rubbers, the ratio of the blend is not particularly limited.

According to the present invention, any carbon black and/or silica normally formulated in a rubber composition is formulated in the rubber composition. The silica according to the present invention is not particularly limited and may be a wet or dry silica or surface treated silica etc. Any silica with silanol groups remaining may be used. Further, a carbon black surface treated with silica may also be used. The amount formulated is 10 to 100 parts by weight based on 100 parts by weight of the rubber.

The rubber composition according to the present invention may further include ordinary vulcanization or cross-linking agents, vulcanization or cross-linking accelerators, various types of oil, antioxidants, fillers, plasticizers, softening agents, and other additives generally formulated into general rubbers. These formulations may be kneaded and vulcanized by general methods to make a composition which is then vulcanized or cross-linked. The amounts of these additives added may be the amounts generally used in the past so long as they do not contravene the objects of the present invention.

There are numerous examples of formulations of tire tread rubber compositions according to the present invention. Giving the preferable examples of formulations comprised of selected rubber components and other compounding agents in tire tread rubber compositions, the following (A) to (D) may be mentioned.

(A) A tire tread rubber composition comprising 100 parts by weight of at least one rubber selected from the group consisting of natural rubber, polybutadiene rubber, styrene-butadiene copolymer rubber, and polyisoprene rubber in which 45 to 80 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g or another filler (for example, silica, talc, clay, calcium carbonate, etc.), 5 to 50 parts by weight of a modified polysiloxane of the present invention, and a softening agent and other rubber chemicals are formulated.

(B) A tire tread rubber composition comprising 100 parts by weight of at least one rubber selected from the group consisting of natural rubber, polybutadiene rubber, styrene-butadiene copolymer rubber, and polyisoprene rubber in which 20 to 60 parts by weight of at least one filler selected from the group consisting of carbon blacks having a specific. surface area by nitrogen adsorption ($N_2SA$) of 50 to 170 $m^2/g$ and a dibutyl phthalate oil absorption (DBP) of 60 to 140 ml/100 g, 5 to 50 parts by weight of at least one filler selected from the group consisting of silicas having a specific surface area by nitrogen adsorption ($N_2SA$) of 80 to 300 $m^2/g$ and a dibutyl phthalate oil absorption (DBP) of 100 to 300 ml/100 g, 5 to 50 parts by weight of a modified polysiloxane of the present invention, and a softening agent and other rubber chemicals are formulated.

(C) A tire tread rubber composition comprising 100 parts by weight of at least one rubber selected from the group consisting of styrene-butadiene copolymer rubbers having a styrene content of at least 10% by weight in which 60 to 100 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 70 to 140 ml/100 g or other fillers, 5 to 50 parts by weight of a modified polysiloxane of the present invention, and a softening agent and other rubber chemicals are formulated.

(D) A tire tread rubber composition comprising 100 parts by weight of at least one rubber selected from the group consisting of styrene-butadiene copolymer rubbers having a styrene content of at least 10% by weight in which 20 to 80 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 70 to 140 ml/100 g, 5 to 50 parts by weight of at least one filler selected from the group consisting of silicas having a specific surface area by nitrogen adsorption ($N_2SA$) of 80 to 300 $m^2/g$ and a dibutyl phthalate oil absorption (DBP) of 100 to 300 ml/100 g, 5 to 50 parts by weight of a modified polysiloxane of the present invention, and a softening agent and other rubber chemicals are formulated.

The rubber used as a rubber component in the tire tread rubber compositions of the above (A) to (D) is selected, in particular, in accordance with the requirements of the ice and snow performance and abrasion resistance. Further, the ranges of selection of the specific surface area by nitrogen adsorption ($N_2SA$) and the dibutyl phthalate oil absorption (DBP) of the carbon black and silica, and the given amounts of formulating of the same are necessary for achieving a good balance between improvement of the abrasion resistance by carbon and the improvement of the ice and snow/wet road performance by silica aimed at by the tire tread rubber composition of the present invention.

When formulating a polysiloxane having a siloxane structure of the above formulas (1) to (3) in a rubber, it is desirable to formulate the same as a master batch in which carbon black and silica are premixed in predetermined amounts. The method of mixing is preferably solution mixing in a good solvent or mechanical mixing by an internal mixer (Banbury or kneader). If the above polysiloxane and carbon black and silica are mixed together in advance, the desired effect can be further improved by sufficiently combining the carbon black and silica and promoting the dispersion of the polysiloxane in the rubber.

Further, when preparing the above master batch, if a predetermined amount of a silane coupling agent is formulated into the above polysiloxane and carbon black and silica, the dispersion of the master batch is further promoted when formulating it in the rubber and the reinforcing property is increased. Further, if a predetermined amount of a silanol condensation catalyst is formulated in, the silane coupling agent works effectively and the reinforcing property is further increased.

When formulating silica as a filler in the tire tread rubber compositions of the above (A) to (D), it is possible to formulate 5 to 30% by weight of a silane coupling agent in the rubber compositions based on the amount of silica formulated. Further, in this case, it is possible to formulate 0.05 to 50% by weight of a silanol condensation catalyst based on the amount of the silane coupling agent formulated. As the silanol catalyst, a tin-based, amine-based or titanium-based catalyst is preferably used. In particular, a titanium-based catalyst is preferred.

As the silane coupling agent used for a tire tread rubber composition containing silica according to the present invention, it is possible to use any silane coupling agent used together with a silica filler in the past. As typical examples, the following may be mentioned. Of these, bis-[3-(triethoxysilyl)-propyl]tetrasulfide and bis-[3-(triethoxysilyl)-propyl]disulfide are most preferred from the viewpoint of the processability.

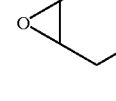

| Chemical name | Structural formula |
| --- | --- |
| Vinyltrimethoxysilane | $CH_2{=}CHSi(OCH_3)_3$ |
| Vinyltriethoxysilane | $CH_2{=}CHSi(OCH_2CH_3)_3$ |
| Vinyltris(2-methoxyethoxy)silane | $CH_2{=}CHSi(OCH_2CH_2OCH_3)_3$ |
| N-(2-aminoethyl)3-aminopropylmethyl dimethoxysilane | $H_2NCH_2CH_2NH(CH_2)_3Si(OCH_3)_2{-}CH_3$ |
| N-(2-aminoethyl)3-aminopropyltrimethoxy silane | $H_2NCH_2CH_2NH(CH_2)_3Si(OCH_3)_3$ |
| 3-aminopropyltrimethoxy silane | $H_2N(CH_2)_3Si(OCH_3)_3$ |
| 3-glycidoxypropyltri methoxysilane | (epoxy)$CHCH_2O(CH_2)_3Si(OCH_3)_3$ |
| 3-glycidoxypropylmethyl dimethoxysilane | (epoxy)$CHCH_2O(CH_2)_3Si(OCH_3)_2{-}CH_3$ |
| 2-(3,4-epoxycyclohexyl)ethyl trimethoxysilane | (epoxycyclohexyl)$CH_2CH_2Si(OCH_3)_3$ |
| 3-methacryloxypropyl trimethoxysilane | $CH_2{=}CCO_2(CH_2)_3Si(OCH_3)_3{-}CH_3$ |
| 3-mercaptopropyl trimethoxylsilane | $HS(CH_2)_3Si(OCH_3)_3$ |
| 3-aminopropyl triethoxysilane | $H_2N(CH_2)_3Si(OCH_2CH_3)_3$ |
| bis-[3-(triethoxysilyl)-propyl]tetrasulfide | $[(CH_3CH_2O)_3Si(CH_2)_3]_2{-}S_4$ |
| bis-[3-(triethoxysilyl)-propyl]disulfide | $[(CH_3CH_2O)_3Si(CH_2)_3]_2{-}S_2$ |

When formulating a silane coupling agent in a tire tread rubber composition containing silica in which the modified polysiloxane of the present invention is formulated, it is possible to use a smaller amount of the silane coupling agent per se compared with those in the past and it is possible to further improve the abrasion resistance. The amount of the silane coupling agent used in the present invention is preferably in the above range. If the amount formulated is too small, the desired effect is not obtained. Contrary to this, if the amount is too large, scorching easily occurs during the mixing or extrusion process. Further, if the silanol condensation catalyst is used together with a predetermined amount of the above, the reaction of the silane coupling agent with the silica proceeds well, the effect of the silane coupling agent is further improved, and it is possible to reduce the amount of the expensive silane coupling agent used.

Next, the constitution and working-effect of the reactive plasticizer of the present invention will be explained. The siloxane-based reactive plasticizer of the present invention may be obtained by reacting a plasticizing component, that is, an ester group containing organic group or hydrocarbon group, for example, an arylester or vinylester of a carboxylic acid, or a 1-octene, isooctene, 1-decene, limonene, vinylcyclohexene, styrene, divinylbenzene, α-methylstyrene or α-methylstyrene dimer with a reactive group, that is, a methyl hydrogen polysiloxane, a Si—H group-containing polysiloxane such as Si—H terminated polydimethylsiloxane, which constitutes an alkoxysilyl group and/or acyloxysilyl group, using a Group VIII transition metal catalyst such as platinum, ruthenium, rhodium catalyst. Further, the siloxane-based reactive plasticizer may be obtained by reacting said carboxylic acid ester or 1-octene, isooctene, limonene, vinylcyclohexene, styrene, divinylbenzene, α-methylstyrene, or α-methylstyrene diner with a trimethoxysilane or methyldimethoxysilane using the said catalyst, and then hydrolyzing and condensing these compounds.

The above carboxylic acid is not particularly limited, but for example dicarboxylic acid such as a phthalic acid, adipic acid, sebacic acid, monocarboxylic acid such as oleic acid, linoleic acid, linolic acid, 2-ethylhexanoic acid, benzoic acid may be mentioned.

As the above organic group, a 1-octene, isooctene, 1-decene, limonene, vinylcyclohexene, styrene, divinylbenzene, α-methylstyrene, α-methylstyrene dimer residual group may be mentioned.

As the alkoxysilyl group constituting the reactive group of the reactive plasticizer of the present invention, a methoxysilyl, ethoxysilyl, propoxysilyl, or butoxysilyl group may be mentioned, but a methoxysilyl or ethoxysilyl group is particularly preferred from the viewpoint of reactivity. On the other hand, as the acyloxysilyl group, specifically, a silyl ester of acetic acid, 2-ethylhexanoic acid, palmitic acid, stearic acid, oleic acid, etc. may be mentioned, but the use of a $C_6$ or more acyloxysilyl group is particularly preferable from the viewpoint of the odor.

The alkoxysilyl group and acyloxysilyl group constituting the reactive group of the reactive plasticizer of the present invention may be introduced by reacting a metal salt of an alcohol or a carboxylic acid (for example, sodium ethoxide, sodium oleate) with a chlorosilyl group, or by reacting an alcohol or carboxylic group with a compound having an Si—H group in the presence of a transition metal catalyst such as platinum catalyst.

As the reactive plasticizer of the present invention, specifically the following compounds F to M may be mentioned:

F:
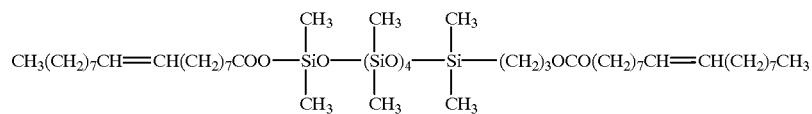
G:
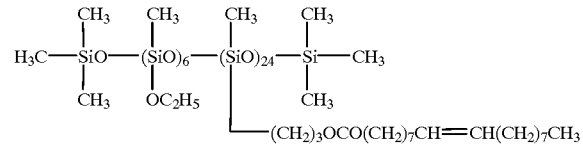
H:
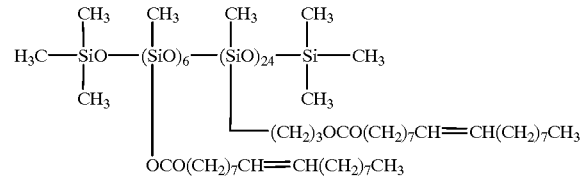
I:
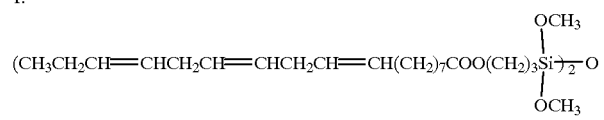
J:
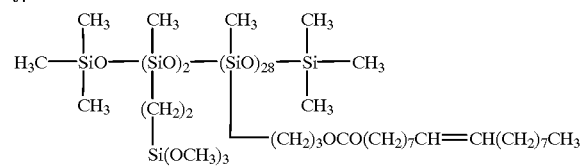
K:
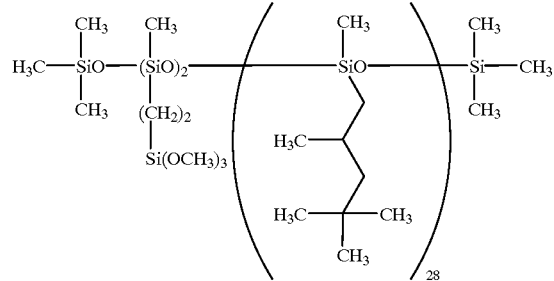
L:
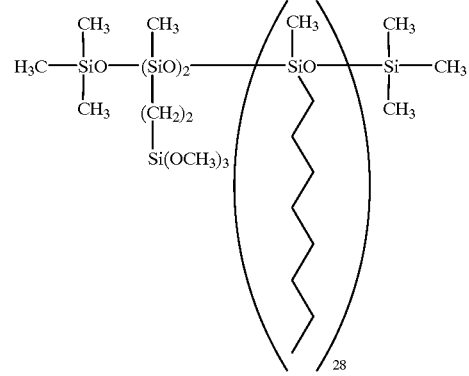

M:

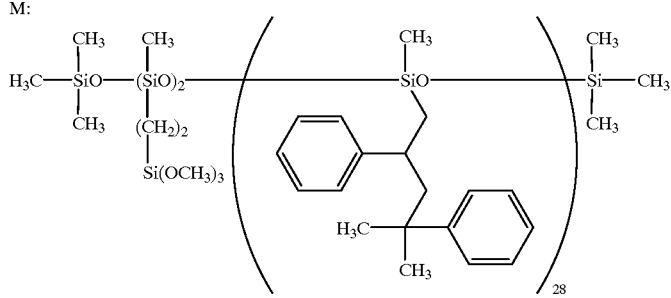

EXAMPLES

The present invention will now be explained by Examples, but the present invention is of course not limited to these Examples.

(A) Standard Examples 1 to 10, Examples 1 to 40, and Comparative Examples 1 to 11

As the rubber in which the reactive plasticizer of the present invention is formulated, a rubber used in various rubber compositions in the past, for example, natural rubber (NR), polyisoprene rubber (IR), various polybutadiene rubbers (BR), various styrene-butadiene copolymer rubbers (SBR), acrylonitrile-butadiene copolymer rubbers (NBR), butyl rubber (IIR), ethylene-propylene copolymer rubbers (EPR, EPDM), etc. may be mentioned. Further, as the resin, vinyl chloride, urethane, acryl, styrene resins, etc. may be mentioned.

The rubber or resin composition in which the reactive plasticizer of the present invention is formulated may contain various fillers (carbon black, silicon-containing fillers such as silica, clay, mica, kaolin, activated clay, and calcium carbonate), vulcanizing or cross-linking agents, vulcanization or cross-linking accelerators, oils, antioxidants, UV absorbents, and the like. The amounts used may be the previous amounts so long as the objects of the present invention are not impaired.

The polysiloxanes 1 to 4 used for the formulations of the following Examples etc. were synthesized by the following general methods:

Synthesis of Polysiloxane 1 (Polyisobutylene-Containing Polysiloxane)

50 g of H-siloxane (made by Wacker Chemicals) was added dropwise to 25 g of ethanol and 30 μl of a 2.5% chloroplatinic acid isopropyl alcohol solution at 60° C. over 1 hour. After the dropwise addition was ended, the mixture was allowed to react at 70° C. for 2 hours. On the other hand, 440 g of alkenyl terminated polyisobutylene (made by Nippon Petrochemicals, high reactivity polyisobutene, molecular weight 3700) was dissolved in 220 of toluene, 60 g of silicone synthesized by the above was added to this solution, then the mixture was allowed to react at 80° C. for 4 hours. $^1$HNMR showed that the alkenyl groups of the polyisobutylene disappeared and confirmed the presence of Si—CH$_2$—CH.

Synthesis of Polysiloxane 2 (Polypropylene Glycol-Containing Polysiloxane)

50 g of H-siloxane (made by Wacker Chemicals) was added dropwise to 25 g of ethanol and 30 μl of a 2.5% chloroplatinic acid isopropyl alcohol solution at 60° C. over 1 hour. After the dropwise addition was ended, the mixture was allowed to react at 70° C. for 2 hours. Next, 260 g of propylene oxide-ethylene oxide copolymer arylbutyl ether (Unisafe PKA-5017, made by Nippon Oil and Fats) (molecular weight 2500), PO/EO=50/50 (molar ratio)) was added and the mixture reacted at 80° C. for 4 hours. $^1$HNMR showed that the alkenyl groups of the polyether disappeared and confirmed the presence of Si—CH$_2$—CH$_2$.

Synthesis of Polysiloxane 3 (Polyisobutylene/Vinyltriethoxysilane-Containing Polysiloxane)

800 g of alkenyl terminated polyisobutylene (molecular weight 1250), 30 g of vinyltriethoxysilane, 200 g of toluene, and 50 μl of a 2.5% chloroplatinic acid isopropyl solution were added to 50 g of H-siloxane and allowed to react at 60° C. for 2 hours and 90° C. for 5 hours. $^1$HNMR confirmed that the Si—H groups were reduced by over 90%. After the end of the reaction, the toluene and unreacted vinyltriethoxysilane were distilled off.

Synthesis of Polysiloxane 4 (Polypropylene Glycol/Vinyltriethoxysilane-Containing Polysiloxane)

1600 g of propylene oxide-ethylene oxide copolymer arylbutyl ether (Unisafe PKA-5017, made by Nippon Oil and Fats) (molecular weight 2500), 30 g of vinyltriethoxysilane, 400 g of toluene, and 50 μl of a 2.5% chloroplatinic acid isopropyl solution were added to 50 g of H-siloxane and allowed to react at 60° C. for 2 hours and 90° C. for 5 hours. $^1$HNMR confirmed that the Si—H groups were reduced by over 90%. After the end of the reaction, the toluene and unreacted vinyltriethoxysilane were distilled off.

For the rest of the formulating ingredients used for the formulations of the Standard Examples, Examples, and Comparative Examples, the following commercially available products were used.

The "vinyl amount" described here, however, is the fraction of the butadiene component in the styrene-butadiene copolymer rubber. The "phr" is an abbreviation for per hundred rubber.

NR (natural rubber): SIR-20

SBR: Nipol 1502 (Nippon Zeon)

Emulsion polymerized styrene-butadiene copolymer rubber of a styrene amount of 24.5%, vinyl amount of 15.1%, weight average molecular weight of 430,000, and glass transition temperature of −52° C.

SBR: Nipol 9520 (Nippon Zeon)

37.5 phr oil extended emulsion polymerized styrene-butadiene copolymer rubber of a styrene amount of 37.9%, vinyl amount of 14.3%, weight average molecular weight of 840,000, and glass transition temperature of −32° C.

SBR: Nipol 1730 (Nippon Zeon)

20 phr oil extended emulsion polymerized styrene-butadiene copolymer rubber of a styrene amount of 25%, vinyl amount of 16%, weight average molecular weight of 650,000, and glass transition temperature of −50° C.

cis-BR: Nipol BR 1220
  Weight average molecular weight of 450,000 and glass transition temperature of −102° C.
SBR: Nipol NS116 (Nippon Zeon)
  Terminal modified/coupling treated solution polymerization styrene-butadiene copolymer rubber of a styrene amount of 20%, vinyl amount of 65%, weight average molecular weight of 360,000, and glass transition temperature of −30° C.
Carbon black: Seast KH (Tokai Carbon)
  $N_2SA$ $(m^2/g)$=92, DBP (ml/100 g)=117
Carbon black: Dia Black A (DIA I) (Mitsubishi Chemical)
  $N_2SA$ $(m^2/g)$=112, DBP (ml/100 g)=112
SAF carbon black: Seast 9M (Tokai Carbon)
  $N_2SA$ $(m^2/g)$=153, DBP (ml/100 g)=127
Silica: Nipsil AQ (Nippon Silica Industry)
Silane coupling agent: Si69 (Degussa) (chemical name: bis-[3-(triethoxysilyl)-propyl]tetrasulfide)
Silanol condensation catalyst: Titanium chelate, Orgatics Tc-100 (made by Matsumoto Seiyaku Kogyo)
Antioxidant 6C: N-phenyl-N'-(1,3-dimethylbutyl)-P-phenylene diamine
Vulcanization accelerator CZ: N-cyclohexyl-2-benzothiazyl sulfenamide
Vulcanization accelerator DPG: Diphenyl guanidine
Vulcanization accelerator NS: N-tert-butyl-2-benzothiazolyl sulfenamide The silica- and carbon black-containing polysiloxane master batches 1 to 9 used for the formulations of the following Examples were prepared by the following general methods.

Predetermined amounts of silica and carbon black and predetermined amounts of polysiloxane and other formulating ingredients (silane coupling agents and silanol condensation catalysts) were mixed using a 500 cc pressurized kneader type internal mixer for 5 to 10 minutes at an internal mixer temperature of 100 to 120° C. to obtain master batches.

The formulations of the master batches were as follows:

Master batch 1: A silica-containing polysiloxane master batch comprising 100 parts by weight of polysiloxane 1 and 50 parts by weight of silica (Nipsil AQ)

Master batch 2: A silica-containing polysiloxane master batch comprising 100 parts by weight of polysiloxane 1, 50 parts by weight of silica (Nipsil AQ), and 5 parts by weight of a silane coupling agent Master batch 3: A silica-containing polysiloxane master batch comprising 100 parts by weight of polysiloxane 1, 50 parts by weight of silica (Nipsil AQ), 5 parts by weight of a silane coupling agent, and 1 part by weight of a silanol condensation catalyst (TPT100)

Master batch 4: A silica-containing polysiloxane master batch comprising 100 parts by weight of Yt polysiloxane 1 and 100 parts by weight of silica (Nipsil AQ)

Master batch 5: A carbon black-containing polysiloxane master batch comprising 100 parts by weight of polysiloxane 1 and 50 parts by weight of carbon black (DIA-1)

Master batch 6: A silica- and carbon black-containing polysiloxane master batch comprising 100 parts by weight of polysiloxane 1, 30 parts by weight of silica (Nipsil AQ), and 30 parts by weight of carbon black (DIA-1)

Master batch 7: A silica-containing polysiloxane master batch comprising 100 parts by weight of polysiloxane 2 and 50 parts by weight of silica (Nipsil AQ)

Master batch 8: A silica-containing polysiloxane master batch comprising 100 parts by weight of polysiloxane 2, 50 parts by weight of silica (Nipsil AQ), and 5 parts by weight of silane coupling agent Master batch 9: A carbon black-containing polysiloxane master batch comprising 100 parts by weight of polysiloxane 1 and 50 parts by weight of carbon black (SAF grade carbon black)

Preparation of Samples

The ingredients except for the vulcanization accelerator and sulfur were kneaded in a 1.6 liter internal mixer for 3 to 5 minutes and were discharged when they reached 165±5° C. The vulcanization accelerator and sulfur were kneaded with the master batch by an 8-inch open roll to obtain a rubber composition. The unvulcanized physical property, that is, the "Mooney viscosity", of the obtained rubber composition was then measured.

Next, the composition was vulcanized by pressing in a 15×15×0.2 cm mold at 160° C. for 20 minutes to prepare the desired test piece (rubber sheet) which was then evaluated as to its vulcanized physical properties, that is, "amount of extraction of solvent", "300% modulus", "JIS hardness: room temperature and −20° C.", "JIS hardness: measured at room temperature after heating and aging in air", "tanδ: 0° C. and 60° C.", "ice skid resistance and wet skid resistance", and "abrasion resistance".

The test methods for the unvulcanized physical properties and vulcanized physical properties of the compositions obtained in the Examples were as follows:

Amount of Extraction of Solvent of Vulcanized Rubber
  0.5 g of rubber was Soxhlet extracted for 8 hours using n-hexane as an extraction solvent.

Unvulcanized Physical Properties

1) Mooney viscosity: Measured at 100° C. based on JIS K 6300.

Vulcanized Physical Properties 1) 300% modulus: Measured in accordance with JIS K 6251 (dumbbell No. 3)

2) JIS hardness (room temperature and −20° C.): Measured in accordance with JIS K 6253

Further, the test of aging by heating in air was performed in accordance with JIS K 6250 and measurement conducted at 100° C. for 48 hours.

3) tanδ (0° C. and 60° C.): Viscoelasticity measured using a Toyo Seiki Seisakusho Rheorograph Solid at an initial strain of 10%, a dynamic strain of 2%, and a frequency of 20 Hz (sample width: 5 mm).

4) Ice skid resistance and wet skid resistance: Measured using a British Portable Skid Tester under conditions of an icy road surface (temperature: −3° C.) and a wet road surface (temperature: room temperature) and indexed to the Standard Example as 100. The larger the value, the better the skid resistance.

5) Abrasion resistance
  The amount of abrasion loss was measured using a Lanbourn abrasion tester (made by Iwamoto Seisakusho) under conditions of a temperature of 20° C. and a slip rate of 50% and was indexed to the Standard Example as 100. The larger the value, the better the abrasion resistance.

Standard Examples 1 to 2, Examples 1 to 10, and Comparative Examples 1 to 2

These Examples show the results of evaluation for rubber compositions comprising NR rubber compositions in which the above polysiloxane 1 or 2 is formulated. The formulations and results of the Examples are shown in the following Table I.

TABLE I

|  | Stand. Ex. 1 | Ex. 1 | Comp. Ex. 1 | Stand. Ex. 2 | Ex. 2 | Ex. 3 | Comp. Ex. 2 |
|---|---|---|---|---|---|---|---|
| NR (SIR-20) | 100.0 | 100.0 | 100.0 | 100.0 | 100.0 | 100.0 | 100.0 |
| SBR (Nipol 1502) |  |  |  |  |  |  |  |
| Carbon black (Seast KH) | 50.0 | 50.0 | 50.0 | 30.0 | 30.0 | 30.0 | 30.0 |
| Silica (Nipsil AQ) |  |  |  | 20.0 | 20.0 | 20.0 | 20.0 |
| Silane coupling agent (Si69) |  |  |  | 2.0 |  | 2.0 | 2.0 |
| Activant (diethylene glycol) |  |  |  | 2.0 | 2.0 | 2.0 | 2.0 |
| Silanol condensation catalyst |  |  |  |  |  |  |  |
| Polysiloxane 1 |  | 20.0 |  |  | 20.0 | 20.0 |  |
| Polysiloxane 2 |  |  |  |  |  |  |  |
| Zinc White No. 3 | 3.0 | 3.0 | 3.0 | 3.0 | 3.0 | 3.0 | 3.0 |
| Industrial stearic acid | 1.0 | 1.0 | 1.0 | 1.0 | 1.0 | 1.0 | 1.0 |
| Antioxidant 6C | 1.0 | 1.0 | 1.0 | 1.0 | 1.0 | 1.0 | 1.0 |
| Aromatic process oil |  |  | 20 |  |  |  | 20.0 |
| Oil treated powdered sulfur | 1.7 | 1.7 | 1.7 | 1.7 | 1.7 | 1.7 | 1.7 |
| Vulcanization accelerator CZ | 1.0 | 1.0 | 1.0 | 1.0 | 1.0 | 1.0 | 1.0 |
| Vulcanization accelerator DPG |  |  |  | 0.5 | 0.5 | 0.5 | 0.5 |
| Amount of solvent extracted of vulcanized rubber (/100 parts rubber) | 5.8 | 8.7 | 25.7 | 6.2 | 6.3 | 6.1 | 25.5 |
| [Unvulcanized physical properties] |  |  |  |  |  |  |  |
| Mooney viscosity | 101 | 48 | 58 | 125 | 63 | 61 | 66 |
| [Vulcanized physical properties] |  |  |  |  |  |  |  |
| 300% modulus (MPa) | 14.1 | 9.9 | 10.3 | 12.1 | 9.2 | 10.1 | 9.3 |
| JIS hardness (room temp.) | 62 | 57 | 58 | 63 | 58 | 59 | 58 |
| JIS hardness (−20° C.) | 69 | 61 | 62 | 67 | 59 | 60 | 61 |
| tanδ (0° C.) | 0.25 | 0.31 | 0.30 | 0.21 | 0.26 | 0.27 | 0.25 |
| tanδ (60° C.) | 0.15 | 0.13 | 0.19 | 0.13 | 0.11 | 0.10 | 0.16 |
| Ice skid resistance (−3° C.) | 100 | 120 | 118 | 112 | 131 | 133 | 129 |
| Abrasion resistance | 100 | 70 | 60 | 73 | 61 | 65 | 41 |

|  | Ex. 4 | Ex. 5 | Ex. 6 | Ex. 7 | Ex. 8 | Ex. 9 | Ex. 10 |
|---|---|---|---|---|---|---|---|
| NR (SIR-20) | 100.0 | 100.0 | 100.0 | 100.0 | 100.0 | 100.0 | 100.0 |
| SBR (Nipol 1502) |  |  |  |  |  |  |  |
| Carbon black (Seast KH) | 50.0 | 30.0 | 30.0 | 30.0 | 30.0 | 30.0 | 30.0 |
| Silica (Nipsil AQ) |  | 20.0 | 20.0 | 20.0 | 20.0 | 20.0 | 20.0 |
| Silane coupling agent (Si69) |  | 2.0 | 2.0 | 2.0 | 2.0 | 2.0 | 2.0 |
| Activant (diethylene glycol) |  | 2.0 | 2.0 | 2.0 | 2.0 | 2.0 | 2.0 |
| Silanol condensation catalyst |  | 1.0 | 1.0 |  |  |  |  |
| Polysiloxane 1 |  | 20.0 |  | 10.0 | 30.0 |  |  |
| Polysiloxane 2 | 20.0 |  | 20.0 |  |  | 10.0 | 50.0 |
| Zinc White No. 3 | 3.0 | 3.0 | 3.0 | 3.0 | 3.0 | 3.0 | 3.0 |
| Industrial stearic acid | 1.0 | 1.0 | 1.0 | 1.0 | 1.0 | 1.0 | 1.0 |
| Antioxidant 6C | 1.0 | 1.0 | 1.0 | 1.0 | 1.0 | 1.0 | 1.0 |
| Aromatic process oil |  |  |  |  |  |  |  |
| Oil treated powdered sulfur | 1.7 | 1.7 | 1.7 | 1.7 | 1.7 | 1.7 | 1.7 |
| Vulcanization accelerator CZ | 1.0 | 1.0 | 1.0 | 1.0 | 1.0 | 1.0 | 1.0 |
| Vulcanization accelerator DPG |  | 0.5 | 0.5 | 0.5 | 0.5 | 0.5 | 0.5 |
| Amount of solvent extracted of vulcanized rubber (/100 parts rubber) | 5.6 | 6.2 | 6.1 | 5.9 | 6.5 | 6.0 | 7.0 |
| [Unvulcanized physical properties] |  |  |  |  |  |  |  |
| Mooney viscosity | 49.1 | 51.1 | 52.1 | 78.2 | 49.1 | 77.5 | 36.9 |
| [Vulcanized physical properties] |  |  |  |  |  |  |  |
| 300% modulus (MPa) | 9.9 | 9.2 | 9.3 | 12.1 | 7.9 | 11.8 | 6.3 |
| JIS hardness (room temp.) | 57 | 58 | 57 | 61 | 56 | 60 | 52 |
| JIS hardness (−20° C.) | 61 | 61 | 60 | 64 | 58 | 63 | 56 |
| tanδ (0° C.) | 0.23 | 0.26 | 0.21 | 0.25 | 0.28 | 0.21 | 0.17 |
| tanδ (60° C.) | 0.13 | 0.11 | 0.10 | 0.12 | 0.10 | 0.12 | 0.09 |
| Ice skid resistance (−3° C.) | 118 | 128 | 132 | 111 | 138 | 108 | 142 |
| Abrasion resistance | 71 | 61 | 68 | 83 | 51 | 88 | 51 |

From the results of Table I, the following is understood.

In the compositions of Examples 1 to 10 comprising the rubber compositions of the Standard Examples 1 and 2 in which predetermined amounts of polysiloxane 1 or 2 is formulated, while the degree of migration is kept low (acetone extracted weight is small), the processability when unvulcanized is remarkably increased (Mooney viscosity falls). Further, judging from the vulcanized physical properties, it was learned that the compositions are superior in terms of the temperature dependency of the hardness, the tanδ balance, and the performance on ice. As opposed to this, in Comparative Examples 1 and 2 where polysiloxane 1 or 2 was not added, but an aromatic process oil (softening agent) was added and the processability when unvulcanized was increased, the abrasion resistance declined and the migration remarkably increased. Further, as shown in Examples 5 to 10, when the amount of the polysiloxane 1 or 2 was changed, it was learned that an increase of the amount formulated leads to a major improvement in the processability and performance on ice while at least keeping the migration small.

Standard Examples 3 to 4, Examples 11 to 13, and Comparative Examples 3 to 4

These Examples show the results of evaluation for rubber compositions comprising SBR rubber compositions in which the above polysiloxane 1 or 2 is formulated. The formulations and results of the Examples are shown in the following Table II.

From the results of Table II, the following is understood.

formulated, it was learned that the processability when unvulcanized can be remarkably increased while keeping the degree of migration low and the temperature dependency of hardness, the tanS balance, the performance on ice, and the wet grip are superior. As opposed to this, in Comparative Examples 3 and 4 where polysiloxane 1 or 2 is not added, but an aromatic process oil is added and the processability when unvulcanized is increased, the abrasion resistance deteriorates and the migration remarkably increases.

Standard Examples 5 to 6, Examples 14 to 17 and Comparative Examples 5 to 8

These Examples show the results of evaluation for rubber compositions comprising NR+cisBR rubber compositions in which the above polysiloxane 1 or 2 is formulated. The

TABLE II

|  | Stand. Ex. 3 | Ex. 11 | Comp. Ex. 3 | Stand. Ex. 4 | Ex. 12 | Ex. 13 | Comp. Ex. 4 |
|---|---|---|---|---|---|---|---|
| NR (SIR-20) | | | | | | | |
| SBR (Nipol 1502) | 100.0 | 100.0 | 100.0 | 100.0 | 100.0 | 100.0 | 100.0 |
| Carbon black (Seast KH) | 50.0 | 50.0 | 50.0 | 30.0 | 30.0 | 30.0 | 30.0 |
| Silica (Nipsil AQ) | | | | 20.0 | 20.0 | 20.0 | 20.0 |
| Silane coupling agent (Si69) | | | | 2.0 | 2.0 | 2.0 | 2.0 |
| Activant (diethylene glycol) | | | | 2.0 | 2.0 | 2.0 | 2.0 |
| Silanol condensation catalyst | | | | | | | |
| Polysiloxane 1 | | 20.0 | | | 20.0 | | |
| Polysiloxane 2 | | | | | | 20.0 | |
| Zinc White No. 3 | 3.0 | 3.0 | 3.0 | 3.0 | 3.0 | 3.0 | 3.0 |
| Industrial stearic acid | 1.0 | 1.0 | 1.0 | 1.0 | 1.0 | 1.0 | 1.0 |
| Antioxidant 6C | 1.0 | 1.0 | 1.0 | 1.0 | 1.0 | 1.0 | 1.0 |
| Aromatic process oil | | | 20.0 | | | | 20.0 |
| Oil treated powdered sulfur | 1.7 | 1.7 | 1.7 | 1.7 | 1.7 | 1.7 | 1.7 |
| Vulcanization accelerator CZ | 1.0 | 1.0 | 1.0 | 1.0 | 1.0 | 1.0 | 1.0 |
| Vulcanization accelerator DPG | | | | 0.5 | 0.5 | 0.5 | 0.5 |
| Amount of solvent extracted of vulcanized rubber (/100 parts rubber) | 9.3 | 10.1 | 29.5 | 9.5 | 9.5 | 9.6 | 29.6 |
| [Unvulcanized physical properties] | | | | | | | |
| Mooney viscosity | 83.2 | 43.2 | 45.3 | 98.1 | 51.1 | 50.2 | 49.3 |
| [Vulcanized physical properties] | | | | | | | |
| 300% modulus (MPa) | 18.2 | 9.5 | 11.4 | 11.3 | 8.2 | 8.3 | 8.1 |
| JIS hardness (room temp.) | 69 | 63 | 61 | 70 | 64 | 63 | 63 |
| JIS hardness (−20° C.) | 79 | 72 | 73 | 79 | 72 | 71 | 75 |
| tanδ (0° C.) | 0.30 | 0.36 | 0.35 | 0.27 | 0.32 | 0.24 | 0.31 |
| tanδ (60° C.) | 0.21 | 0.16 | 0.26 | 0.17 | 0.16 | 0.15 | 0.21 |
| Ice skid resistance (−3° C.) | 100 | 118 | 117 | 109 | 132 | 136 | 131 |
| Wet skid resistance (room temp.) | 100 | 110 | 108 | 92 | 102 | 92 | 102 |
| Abrasion resistance | 100 | 75 | 73 | 81 | 63 | 65 | 60 |

In the compositions of Examples 11 to 13 comprised of the rubber compositions of Standard Examples 3 and 4 in which predetermined amounts of the polysiloxane 1 or 2 is formulations and results of the Examples are shown in the following Table III.

TABLE III

|  | Stand Ex. 5 | Ex. 4 | Comp. Ex. 5 | Comp. Ex. 6 | Stand. Ex. 6 | Ex. 15 | Comp. Ex. 7 | Ex. 16 | Ex. 17 | Comp. Ex. 8 |
|---|---|---|---|---|---|---|---|---|---|---|
| NR (SIR-20) | 60.0 | 60.0 | 60.0 | 60.0 | 60.0 | 60.0 | 60.0 | 60.0 | 60.0 | 60.0 |
| cisBR (Nipol BR1220) | 40.0 | 40.0 | 40.0 | 40.0 | 40.0 | 40.0 | 40.0 | 40.0 | 40.0 | 40.0 |
| Carbon black (DIA-1) | 50.0 | 50.0 | 50.0 | 50.0 | 30.0 | 30.0 | 30.0 | 50.0 | 30.0 | 30.0 |
| Silica (Nipsil AQ) | | | | | 20.0 | 20.0 | 20.0 | | 20.0 | 20.0 |
| Silane coupling agent (Si69) | | | | | 2.0 | 2.0 | 2.0 | | 2.0 | 2.0 |
| Activant (diethylene glycol) | | | | | 2.0 | 2.0 | 2.0 | | 2.0 | 2.0 |
| Silanol condensation catalyst | | | | | | | | | | |
| Polysiloxane 1 | | 20.0 | | | | 20.0 | | | | |
| Polysiloxane 2 | | | | | | | | 20.0 | 20.0 | |
| Zinc White No. 3 | 3.0 | 3.0 | 3.0 | 3.0 | 3.0 | 3.0 | 3.0 | 3.0 | 3.0 | 3.0 |
| Industrial stearic acid | 1.0 | 1.0 | 1.0 | 1.0 | 1.0 | 1.0 | 1.0 | 1.0 | 1.0 | 1.0 |
| Antioxidant 6C | 1.0 | 1.0 | 1.0 | 1.0 | 1.0 | 1.0 | 1.0 | 1.0 | 1.0 | 1.0 |

TABLE III-continued

| | Stand Ex. 5 | Ex. 4 | Comp. Ex. 5 | Comp. Ex. 6 | Stand. Ex. 6 | Ex. 15 | Comp. Ex. 7 | Ex. 16 | Ex. 17 | Comp. Ex. 8 |
|---|---|---|---|---|---|---|---|---|---|---|
| Polyisobutene (Vistanex) *1 | | | | | | | | | | 20.0 |
| Aromatic process oil | 10.0 | 10.0 | 30.0 | 10.0 | 10.0 | 10.0 | 10.0 | 30.0 | 10.0 | 10.0 |
| Low mol. weight butadiene rubber*2 | | | | 20.0 | | | | | | |
| Oil treated powdered sulfur | 1.7 | 1.7 | 1.7 | 1.7 | 1.7 | 1.7 | 1.7 | 1.7 | 1.7 | 1.7 |
| Vulcanization accelerator NS | 1.0 | 1.0 | 1.0 | 1.0 | 1.0 | 1.0 | 1.0 | 1.0 | 1.0 | 1.0 |
| Vulcanization accelerator DPG | | | | | 0.5 | 0.5 | 0.5 | | 0.5 | 0.5 |
| Amount of solvent extracted of vulcanized rubber (/100 parts rubber) | 15.0 | 15.9 | 35.7 | 24.9 | 15.6 | 16.3 | 35.5 | 15.9 | 16.3 | 28.2 |
| [Unvulcanized physical properties] | | | | | | | | | | |
| Mooney viscosity | 69 | 45 | 49 | 47 | 76 | 50 | 47 | 45 | 50 | 66 |
| [Vulcanized physical properties] | | | | | | | | | | |
| 300% modulus (MPa) | 7.9 | 5.3 | 5.4 | 5.1 | 7.0 | 5.1 | 5.3 | 5.3 | 5.1 | 7.0 |
| JIS hardness (room temp.) | 60 | 48 | 49 | 50 | 58 | 50 | 49 | 49 | 51 | 54 |
| JIS hardness (−20° C.) | 71 | 55 | 60 | 59 | 68 | 57 | 59 | 56 | 58 | 63 |
| JIS hardness (measured at room temp. after aging by heating in air) | 65 | 50 | 51 | 57 | 61 | 53 | 53 | 52 | 54 | 57 |
| tanδ (0° C.) | 0.27 | 0.31 | 0.30 | 0.26 | 0.24 | 0.30 | 0.27 | 0.27 | 0.23 | 0.26 |
| tanδ (60° C.) | 0.20 | 0.18 | 0.22 | 0.19 | 0.17 | 0.15 | 0.20 | 0.20 | 0.14 | 0.20 |
| Ice skid resistance (−3° C.) | 100 | 116 | 116 | 110 | 107 | 119 | 118 | 117 | 121 | 109 |
| Abrasion resistance | 100 | 82 | 79 | 81 | 88 | 68 | 42 | 81 | 70 | 59 |

(*1: Shell Chemicals Vistanex L-140, *2: Nippon Petrochemicals, liquid polybutadiene B-3000)

From the results of Table III, the following was learned.

In the compositions of Examples 14 to 17 comprised of the rubber compositions of Standard Examples 5 and 6 in which predetermined amounts of polysiloxane 1 or 2 is formulated (in this examples, 10 parts by weight of a softening agent, that is, an aromatic process oil, is formulated), it was learned that the processability when unvulcanized is increased while the degree of migration is kept low and the temperature dependency of hardness, the tanδ balance, and the performance on ice are improved. As opposed to this, however, in Comparative Examples 5 to 8 where polysiloxane 1 or 2 is not added, but the amount of the softening agent (aromatic process oil or this and lower molecular weight butadiene or polyisobutene used together) formulated is increased (softening agent increased from 10 parts by weight to 30 parts by weight), the abrasion resistance deteriorates much more and the migration is remarkably increased. The changes in hardness after aging by heating in air were also lower compared with the case of a low molecular weight butadiene. Further, compared with Examples 16 and 17, it is learned that if a predetermined amount of polysiloxane 2 is formulated in a rubber composition, even if silica is used for part of the filler, substantially the same performance is obtained as with formulating a filler comprised solely of carbon black (however, only the performance on ice improved).

Standard Examples 7 to 8, Examples 18 to 22, and Comparative Examples 9 to 11

These Examples show the results of evaluation for rubber compositions comprising SBR rubber compositions of different amounts of oil extension in which the above polysiloxane 1 or 2 is formulated. The formulations and results of the Examples are shown in the following Table IV.

TABLE IV

|  | Stand. Ex. 7 | Ex. 18 | Comp. Ex. 9 | Stand. Ex. 8 | Ex. 19 | Ex. 20 | Comp. Ex. 10 | Comp. Ex. 11 | Ex. 21 | Ex. 22 |
|---|---|---|---|---|---|---|---|---|---|---|
| SBR/Nipol 9520 | 96.25 | 96.25 | 96.25 | 96.25 | 96.25 | 96.25 | 96.25 | 96.25 | 96.25 | 96.25 |
| SBR/Nipol 1730 | 36.00 | 36.00 | 36.00 | 36.00 | 36.00 | 36.00 | 36.00 | 36.00 | 36.00 | 36.00 |
| SAF carbon black | 80.0 | 80.0 | 80.0 | 60.0 | 60.0 | 60.0 | 60.0 | 60.0 | 60.0 | 60.0 |
| Silica (Nipsil AQ) |  |  |  | 20.0 | 20.0 | 20.0 | 20.0 | 20.0 | 20.0 | 20.0 |
| Silane coupling agent (Si69) |  |  |  | 2.0 | 2.0 | 2.0 | 2.0 | 2.0 | 2.0 | 2.0 |
| Activant (diethylene glycol) |  |  |  | 2.0 | 2.0 | 2.0 | 2.0 | 2.0 | 2.0 | 2.0 |
| Silanol condensation catalyst |  |  |  |  |  |  |  |  |  |  |
| Polysiloxane 1 |  | 20.0 |  |  | 20.0 |  |  |  |  |  |
| Polysiloxane 2 |  |  |  |  |  | 20.0 |  |  |  |  |
| Polysiloxane 3 |  |  |  |  |  |  |  |  | 20.0 |  |
| Polysiloxane 4 |  |  |  |  |  |  |  |  |  | 20.0 |
| Zinc White No. 3 | 3.0 | 3.0 | 3.0 | 3.0 | 3.0 | 3.0 | 3.0 | 3.0 | 3.0 | 3.0 |
| Industrial stearic acid | 2.0 | 2.0 | 2.0 | 2.0 | 2.0 | 2.0 | 2.0 | 2.0 | 2.0 | 2.0 |
| Antioxidant 6C | 2.0 | 2.0 | 2.0 | 2.0 | 2.0 | 2.0 | 2.0 | 2.0 | 2.0 | 2.0 |
| Polyisobutene (Vistanex) *1 |  |  |  |  |  |  |  |  |  |  |
| Aromatic process oil |  |  | 20.0 |  |  |  | 20.0 | 20.0 |  |  |
| Oil treated powdered sulfur | 2.0 | 2.0 | 2.0 | 2.0 | 2.0 | 2.0 | 2.0 | 2.0 | 2.0 | 2.0 |
| Vulcanization accelerator CZ | 2.0 | 2.0 | 2.0 | 2.0 | 2.0 | 2.0 | 2.0 | 2.0 | 2.0 | 2.0 |
| Amount of solvent extracted of vulcanized rubber (/100 parts rubber) | 40.1 | 41.5 | 61.2 | 41.6 | 41.7 | 42.1 | 62.7 | 57.1 | 40.1 | 40.7 |
| [Unvulcanized physical properties] |  |  |  |  |  |  |  |  |  |  |
| Mooney viscosity | 75 | 66 | 65 | 81 | 71 | 72 | 70 | 73 | 71 | 71 |
| [Vulcanized physical properties] |  |  |  |  |  |  |  |  |  |  |
| 300% modulus (MPa) | 7.9 | 8.1 | 8.3 | 11.2 | 8.1 | 7.7 | 7.9 | 8.5 | 7.8 | 8.0 |
| JIS hardness (room temp.) | 71 | 64 | 63 | 70 | 64 | 65 | 64 | 66 | 64 | 65 |
| JIS hardness (−20° C.) | 94 | 88 | 89 | 93 | 86 | 84 | 87 | 88 | 85 | 84 |
| tanδ (0° C.) | 0.74 | 0.77 | 0.77 | 0.73 | 0.75 | 0.70 | 0.76 | 0.74 | 0.74 | 0.71 |
| tanδ (60° C.) | 0.33 | 0.31 | 0.31 | 0.30 | 0.28 | 0.27 | 0.33 | 0.35 | 0.25 | 0.26 |
| Wet skid resistance (room temp.) | 100 | 105 | 104 | 103 | 107 | 102 | 107 | 105 | 105 | 104 |
| Abrasion resistance | 100 | 88 | 83 | 83 | 75 | 77 | 55 | 49 | 88 | 87 |

(*1: Shell chemicals Vistanex L-140)

From the results of Table IV, the following was learned.

In the compositions of Examples 18 to 22 comprising the rubber compositions of Standard Examples 7 and 8 in which predetermined amounts of polysiloxanes 1 to 4 are formulated (these further including process oil through oil extension), it was learned that the processability when unvulcanized increased is remarkably while maintaining the degree of migration and the temperature dependency of the hardness and performance on ice are good. As opposed to this, in Comparative Examples 9 to 11 where the polysiloxane 1 or 2 is not added, but aromatic process oil is added, the processability when unvulcanized is increased, the abrasion resistance remarkably deteriorates and the migration considerably increases.

Examples 23 to 27

These Examples relate to polysiloxane master batches containing silica and carbon black and show the results of evaluation for rubber compositions comprising NR+cisBR and different oil extension amount of SBR rubber compositions. The formulations and results of the Examples are shown in the following Table V.

TABLE V

|  | Ex. 23 | Ex. 24 | Ex. 25 | Ex. 26 | Ex. 27 | Ex. 28 | Ex. 29 | Ex. 30 |
|---|---|---|---|---|---|---|---|---|
| NR (SIR-20) | 60.0 | 60.0 | 60.0 | 60.0 | 60.0 | 60.0 | 60.0 | 60.0 |
| cis-Br (Nipol Br1220) | 40.0 | 40.0 | 40.0 | 40.0 | 40.0 | 40.0 | 40.0 | 40.0 |
| SBR/Nipol 9520 |  |  |  |  |  |  |  |  |
| SBR/Nipol 1730 |  |  |  |  |  |  |  |  |
| Carbon black (DIA-1) | 30.0 | 30.0 | 30.0 | 30.0 | 40.0 | 24.0 | 30.0 | 30.0 |
| Carbon black (SAF) |  |  |  |  |  |  |  |  |
| Silica (Nipsil AQ) | 10.0 | 10.0 | 10.0 |  |  | 14.0 | 10.0 | 10.0 |
| Silane coupling agent (Si69) | 2.0 | 1.0 | 1.0 | 1.0 |  |  | 2.0 | 1.0 |
| Activant (diethylene glycol) | 2.0 | 2.0 | 2.0 | 2.0 |  |  | 2.0 | 2.0 |
| Silanol condensation catalyst |  |  |  |  |  |  |  |  |
| Master batch 1 | 30.0 |  |  |  |  |  |  |  |
| Master batch 2 |  | 31.0 |  |  |  |  |  |  |
| Master batch 3 |  |  | 31.2 |  |  |  |  |  |
| Master batch 4 |  |  |  | 40.0 |  |  |  |  |
| Master batch 5 |  |  |  |  | 30.0 |  |  |  |
| Master batch 6 |  |  |  |  |  | 32.0 |  |  |
| Master batch 7 |  |  |  |  |  |  | 30.0 |  |
| Master batch 8 |  |  |  |  |  |  |  | 31.0 |
| Zinc White No. 3 | 3.0 | 3.0 | 3.0 | 3.0 | 3.0 | 3.0 | 3.0 | 3.0 |
| Industrial stearic acid | 1.0 | 1.0 | 1.0 | 1.0 | 1.0 | 1.0 | 1.0 | 1.0 |

TABLE V-continued

|  |  |  |  |  |  |  |  |  |
|---|---|---|---|---|---|---|---|---|
| Antioxidant 6C | 1.0 | 1.0 | 1.0 | 1.0 | 1.0 | 1.0 | 1.0 | 1.0 |
| Polyisobutene (Vistanex) |  |  |  |  |  |  |  |  |
| Aromatic process oil | 10.0 | 10.0 | 10.0 | 10.0 | 10.0 | 10.0 | 10.0 | 10.0 |
| Low mol. weight butadiene rubber |  |  |  |  |  |  |  |  |
| Oil treated powdered sulfur |  |  |  |  |  |  |  |  |
| Vul. accelerator NS | 1.7 | 1.7 | 1.7 | 1.7 | 1.7 | 1.7 | 1.7 | 1.7 |
| Vul. accelerator CZ | 1.0 | 1.0 | 1.0 | 1.0 | 1.0 | 1.0 | 1.0 | 1.0 |
| Vul. accelerator DPG | 0.5 | 0.5 | 0.5 | 0.5 |  | 0.5 | 0.5 | 0.5 |
| Amount of solvent extracted of vulcanized rubber (/100 parts rubber) | 15.7 | 15.4 | 15.8 | 16.1 | 16.0 | 15.9 | 16.2 | 16.2 |
| [Unvulcanized physical properties] |  |  |  |  |  |  |  |  |
| Mooney viscosity | 50 | 51 | 51 | 52 | 48 | 50 | 46 | 47 |
| [Vulcanized physical properties] |  |  |  |  |  |  |  |  |
| 300% modulus (MPa) | 5.2 | 5.4 | 5.5 | 5.4 | 5.4 | 5.1 | 5.0 | 5.1 |
| JIS hardness (room temp.) | 49 | 49 | 50 | 50 | 49 | 51 | 51 | 51 |
| JIS hardness (−20° C.) | 56 | 57 | 57 | 57 | 55 | 57 | 56 | 56 |
| JIS hardness (measured at room temp. after aging by heating in air) | 52 | 53 | 52 | 52 | 51 | 52 | 53 | 54 |
| tan δ (0° C.) | 0.31 | 0.31 | 0.30 | 0.31 | 0.31 | 0.30 | 0.23 | 0.22 |
| tan δ (60° C.) | 0.15 | 0.14 | 0.13 | 0.13 | 0.17 | 0.15 | 0.14 | 0.12 |
| Ice skid resistance (−3° C.) | 116 | 115 | 114 | 114 | 115 | 116 | 122 | 124 |
| Wet skid resistance (room temp.) |  |  |  |  |  |  |  |  |
| Abrasion resistance | 75 | 80 | 55 | 85 | 85 | 77 | 73 | 77 |

|  | Ex. 31 | Ex. 32 | Ex. 33 | Ex. 34 | Ex. 35 | Ex. 36 | Ex. 37 |
|---|---|---|---|---|---|---|---|
| NR (SIR-20) |  |  |  |  |  |  |  |
| cis-Br (Nipol Br1220) |  |  |  |  |  |  |  |
| SBR/Nipol 9520 | 96.25 | 96.25 | 96.25 | 96.25 | 96.25 | 96.25 | 96.25 |
| SBR/Nipol 1730 | 36.00 | 36.00 | 36.00 | 36.00 | 36.00 | 36.00 | 36.00 |
| Carbon black (DIA-1) |  |  |  |  |  |  |  |
| Carbon black (SAF) | 60.0 | 60.0 | 60.0 | 60.0 | 60.0 | 60.0 | 60.0 |
| Silica (Nipsil AQ) | 10.0 | 10.0 | 10.0 | 10.0 | 10.0 | 10.0 | 10.0 |
| Silane coupling agent (Si69) | 2.0 | 1.0 | 1.0 | 1.0 | 1.0 | 1.0 | 1.0 |
| Activant (diethylene glycol) | 2.0 | 2.0 | 2.0 | 2.0 | 2.0 | 2.0 | 2.0 |
| Silanol condensation catalyst |  |  |  |  |  |  |  |
| Master batch 1 | 30.0 |  |  |  |  |  |  |
| Master batch 2 |  | 31.0 |  |  |  |  |  |
| Master batch 3 |  |  | 31.2 |  |  |  |  |
| Master batch 4 |  |  |  | 40.0 |  |  |  |
| Master batch 5 |  |  |  |  |  |  |  |
| Master batch 6 |  |  |  |  |  |  |  |
| Master batch 7 |  |  |  |  |  | 30.0 |  |
| Master batch 8 |  |  |  |  |  |  | 31.0 |
| Zinc White No. 3 | 3.0 | 3.0 | 3.0 | 3.0 | 3.0 | 3.0 | 3.0 |
| Industrial stearic acid | 2.0 | 2.0 | 2.0 | 2.0 | 2.0 | 2.0 | 2.0 |
| Antioxidant 6C | 2.0 | 2.0 | 2.0 | 2.0 | 2.0 | 2.0 | 2.0 |
| Polyisobutene (Vistanex) |  |  |  |  |  |  |  |
| Aromatic process oil |  |  |  |  |  |  |  |
| Low mol. weight butadiene rubber |  |  |  |  |  |  |  |
| Oil treated powdered sulfur |  |  |  |  |  |  |  |
| Vul. accelerator NS | 2.0 | 2.0 | 2.0 | 2.0 | 2.0 | 2.0 | 2.0 |
| Vul. accelerator CZ |  |  |  |  |  |  |  |
| Vul. accelerator DPG | 2.0 | 2.0 | 2.0 | 2.0 | 2.0 | 2.0 | 2.0 |
| Amount of solvent extracted of vulcanized rubber (/100 parts rubber) | 41.6 | 41.2 | 40.0 | 41.0 | 42.0 | 41.1 | 40.6 |
| [Unvulcanized physical properties] |  |  |  |  |  |  |  |
| Mooney viscosity | 73 | 73 | 72 | 72 | 67 | 73 | 74 |
| [Vulcanized physical properties] |  |  |  |  |  |  |  |
| 300% modulus (MPa) | 8.2 | 8.4 | 8.5 | 8.5 | 8.3 | 7.7 | 7.9 |
| JIS hardness (room temp.) | 65 | 65 | 66 | 66 | 65 | 66 | 67 |
| JIS hardness (−20° C.) | 86 | 85 | 85 | 85 | 87 | 84 | 83 |
| JIS hardness (measured at room temp. after aging by heating in air) |  |  |  |  |  |  |  |
| tan δ (0° C.) | 0.75 | 0.75 | 0.74 | 0.76 | 0.75 | 0.69 | 0.70 |
| tan δ (60° C.) | 0.27 | 0.26 | 0.25 | 0.25 | 0.31 | 0.26 | 0.25 |
| Ice skid resistance (−3° C.) |  |  |  |  |  |  |  |
| Wet skid resistance (room temp.) | 108 | 109 | 107 | 108 | 106 | 103 | 104 |
| Abrasion resistance | 79 | 83 | 85 | 85 | 92 | 83 | 87 |

(Note: The ice skid resistance and abrasion resistance of Examples 23 to 30 are shown as indexes against Standard Example 5 as 100.)
(Note: The wet skid resistance and abrasion resistance of Examples 31 to 37 are shown as indexes against Standard Example 7 as 100.)

From the results of Table V, the following was learned.

It was learned that with the same formulations, the abrasion resistance is improved and other properties do not decline by making master batches of the polysiloxanes. Further, if a silane coupling agent and silanol condensation catalyst is formulated in at the master batch stage, the abrasion resistance is further improved and the reinforcing ability is increased.

Standard Examples 9 to 10 and Examples 38 to 40

These Examples show the results of evaluation for rubber compositions of NR+SBR +silica formulations. The formulations of the Examples and the results are shown in Table VI.

TABLE VI

|  | Standard Ex. 9 | Ex. 38 | Standard Ex. 10 | Ex. 39 | Ex. 40 |
|---|---|---|---|---|---|
| NR (SIR-20) | 50.0 | 50.0 | 50.0 | 50.0 | 50.0 |
| SBR (Nipol NS116) | 50.0 | 50.0 | 50.0 | 50.0 | 50.0 |
| Silica (Nipsil AQ) | 50.0 | 50.0 | 50.0 | 50.0 | 50.0 |
| Silane coupling agent (Si69) |  |  | 2.5 | 2.5 | 2.5 |
| Activant (diethylene glycol) | 2.5 | 2.5 | 2.5 | 2.5 | 2.5 |
| Polysiloxane |  | 5.0 |  | 5.0 | 5.0 |
| Zinc White No. 3 | 3.0 | 3.0 | 3.0 | 3.0 | 3.0 |
| Industrial stearic acid | 1.0 | 1.0 | 1.0 | 1.0 | 1.0 |
| Antioxidant 6C | 1.0 | 1.0 | 1.0 | 1.0 | 1.0 |
| Oil treated powdered sulfur | 1.7 | 1.7 | 1.7 | 1.7 | 1.7 |
| Vulcanization accelerator DPG | 0.5 | 0.5 | 0.5 | 0.5 | 0.5 |
| Vulcanization accelerator CZ | 1.0 | 1.0 | 1.0 | 1.0 | 1.0 |
| Amount of solvent extracted of vulcanized rubber (/100 parts rubber) | 5.2 | 5.7 | 5.6 | 5.9 | 6.0 |
| [Unvulcanized physical properties] |  |  |  |  |  |
| Mooney viscosity | 148 | 128 | 111 | 92 | 74 |
| [Vulcanized physical properties] |  |  |  |  |  |
| 300% modulus (MPa) | 4.0 | 3.3 | 9.3 | 9.0 | 7.1 |
| JIS hardness (room temp.) | 69 | 64 | 68 | 61 | 60 |
| JIS hardness (-20° C.) | 87 | 81 | 83 | 75 | 73 |
| tanδ (0° C.) | 0.45 | 0.49 | 0.46 | 0.49 | 0.54 |
| tanδ (60° C.) | 0.11 | 0.12 | 0.12 | 0.12 | 0.13 |
| Wet skid resistance (room temp.) | 100 | 103 | 101 | 103 | 106 |
| Abrasion resistance | 100 | 127 | 135 | 181 | 154 |

The following was learned from the results of Table VI.

In Examples 38 to 40, comprised of Standard Examples 9 and 10 in which predetermined amounts of the polysiloxane 1 were formulated, it is learned that the processability when unvulcanized was remarkably increased while maintaining the degree of migration and the temperature dependency of the hardness was reduced. Further, in silica formulations, it is learned that the addition of polysiloxane gives a plasticizing effect and improves the abrasion resistance. Further, the low temperature side tan5 was improved without raising the high temperature side tan6, and the wet skid resistance was improved.

(B) Regarding Examples 41 to 51 and Comparative Examples 12 to 13

The plasticizers F to M used for the formulations in the following Examples were those of the above chemical formulas. Further, the following commercially available products were used for the rest of the formulating ingredients:

Silica: Nipsil AQ (Nippon Silica Industry)

Talc: (Kanto Kagaku Chemicals)

Calcium carbonate: Calfine 200 (Maruo Calcium)

Carbon black: Seast KH (Tokai Carbon)

NR: SIR-20

SBR: Nipol 1502 (Nippon Zeon)

Vulcanization accelerator CZ: N-cyclohexyl-2-benzothiazyl sulfenamide

Urethane: Coronet 4090 (Nippon Polyurethane Industry), methylene bis o-chloroaniline (curing agent) (100:12.7)

The test method for the acetone extracted weight obtained in the examples was as follows:

Acetone Extracted Weight 5 g of each sample was weighed and Soxhlet extracted by acetone for 8 hours, then the value was converted to a percentage of the total weight.

Examples 41 to 51 and Comparative Examples 12 to 13

These Examples show the results of evaluation for rubber compositions and urethane resin compositions comprised of NR+SBR rubber compositions and urethane resins in which the above plasticizers F to M are formulated.

Regarding the ingredients of the formulations (parts by weight) shown in Table VII, in Examples 41 and 42 and Comparative Example 12, the reactive plasticizer was stirred and mixed with a predetermined amount of filler at room temperature for 5 minutes, while in Examples 44 to 51, calcium carbonate and reactive plasticizer were added to the urethane and the mixture was kneaded by a universal stirring machine for 5 minutes, then the curing agent was added to obtain the compositions. In Examples 43 and Comparative Example 13, however, the ingredients except for the sulfur and vulcanization accelerator were mixed in a 1.8 liter internal mixer for 3 to 5 minutes. When reaching 165±5° C., the mixture was discharged. The sulfur and vulcanization accelerator were kneaded with the master batch by an 8-inch open roll to obtain the rubber composition.

The thus obtained rubber composition or resin composition was processed under the conditions shown in Table VII. The acetone extracted weight was found for the obtained compositions. The results are shown in Table VII.

TABLE VII

|  | Ex. 41 | Ex. 42 | Ex. 43 | Ex. 44 | Ex. 45 | Ex. 46 | Ex. 47 | Ex. 48 | Ex. 49 | Ex. 50 | Ex. 51 | Comp. Ex. 12 | Comp. Ex. 13 |
|---|---|---|---|---|---|---|---|---|---|---|---|---|---|
| Silica | 100 | — | — | — | — | — | — | — | — | — | — | 100 | — |
| Talc | — | 100 | — | — | — | — | — | — | — | — | — | — | — |
| Calcium carbonate | — | — | — | 50 | 50 | 50 | 50 | 50 | 50 | 50 | 50 | — | — |
| Carbon black | — | — | 50 | — | — | — | — | — | — | — | — | — | 50 |

TABLE VII-continued

|  | Ex. 41 | Ex. 42 | Ex. 43 | Ex. 44 | Ex. 45 | Ex. 46 | Ex. 47 | Ex. 48 | Ex. 49 | Ex. 50 | Ex. 51 | Comp. Ex. 12 | Comp. Ex. 13 |
|---|---|---|---|---|---|---|---|---|---|---|---|---|---|
| NR | — | — | 50 | — | — | — | — | — | — | — | — | — | 50 |
| SBR | — | — | 50 | — | — | — | — | — | — | — | — | — | 50 |
| Sulfur | — | — | 1.7 | — | — | — | — | — | — | — | — | — | 1.7 |
| Vul. accelerator CZ | — | — | 1 | — | — | — | — | — | — | — | — | — | 1 |
| Urethane | — | — | — | 100 | 100 | 100 | 100 | 100 | 100 | 100 | 100 | — | — |
| Plasticizer F | — | — | — | — | 20 | — | — | — | — | — | — | — | — |
| Plasticizer G | 20 | 20 | 20 | 20 | — | — | — | — | — | — | — | — | — |
| Plasticizer H | — | — | — | — | — | 20 | — | — | — | — | — | — | — |
| Plasticizer I | — | — | — | — | — | — | 20 | — | — | — | — | — | — |
| Plasticizer J | — | — | — | — | — | — | — | 20 | — | — | — | — | — |
| Plasticizer K | — | — | — | — | — | — | — | — | 20 | — | — | — | — |
| Plasticizer L | — | — | — | — | — | — | — | — | — | 20 | — | — | — |
| Plasticizer M | — | — | — | — | — | — | — | — | — | — | 20 | — | — |
| Butyl oleate | — | — | — | — | — | — | — | — | — | — | — | 20 | 20 |
| Treatment conditions |  |  |  |  |  |  |  |  |  |  |  |  |  |
| Temp. (° C.) | 160 | 160 | 160 | 120 | 120 | 120 | 120 | 120 | 120 | 120 | 120 | 120 | 120 |
| Time | 20 min | 20 min | 20 min | 5 hr | 5 hr | 5 hr | 5 hr | 5 hr | 5 hr | 5 hr | 5 hr | 20 min | 20 min |
| Acetone extracted weight (g) | 0.8 | 1.3 | 3.4 | 1.5 | 3.1 | 1.8 | 0.6 | 2.3 | 1.7 | 1.8 | 1.8 | 18.3 | 19.2 |

As is made clear by the results of Table VII, the reactive plasticizers F to M of the present invention reacts with silica, talc, carbon black, and calcium carbonate or self reacts, therefore the acetone extracted weight is extremely small. Compared with this, in Comparative Examples 12 and 13, no reaction occurs and the extraction of acetone is easy.

INDUSTRIAL APPLICABILITY

As explained above, according to the present invention, by formulating the modified polysiloxane of the present invention in a rubber composition, in particular a tire tread rubber composition of a specific formulation, it is possible to improve the processability when unvulcanized, while maintaining no migration and obtain a rubber composition giving a cured product which is soft even at low temperatures, superior in performance on ice and wet grip, and superior in the tanδ balance and abrasion resistance.

Further, the reactive plasticizer of the present invention, which is an ester-based plasticizer and, therefore can be used over a wide range of applications such as rubber and resins and, in particular in a silica formulation, is non-bleeding. Further, it reacts with other fillers (carbon black and calcium carbonate) to achieve a non-bleeding characteristic.

What is claimed is:

1. A polysiloxane having a siloxane structure of the following formulas (1) and (2):

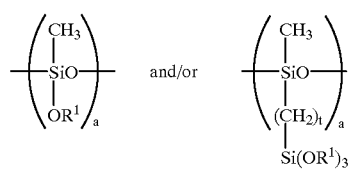

(1)

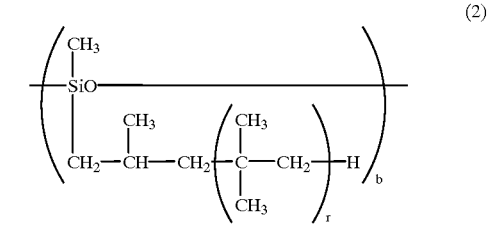

(2)

wherein $R^1$ is a $C_1$ to $C_6$ alkyl group or $C_1$ to $C_{21}$ acyl group, a is 1 to 200, b is 2 to 200, t is 2 or 3, and r is 1 to 100.

2. A rubber composition characterized by comprising 100 parts by weight of rubber and 1 to 50 parts by weight of a polysiloxane having a siloxane structure of the following formulas (1) and (2):

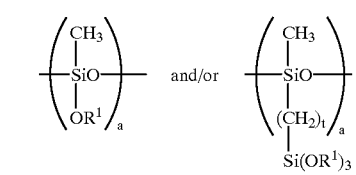

(1)

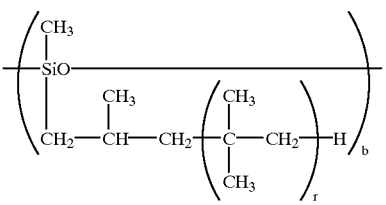

(2)

wherein $R^1$ is a $C_1$ to $C_6$ alkyl group or $C_1$ to $C_{21}$ acyl group, a is 1 to 200, b is 1 to 200, t is 2 or 3, and r is 1 to 100, formulated therein.

3. A rubber composition as set forth in claim 2, comprising silica.

4. A tire tread rubber composition comprising 100 parts by weight of at least one rubber selected from the group consisting of natural rubber, polybutadiene rubber, styrene-butadiene copolymer rubber, and polyisoprene rubber and 45 to 80 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g or other fillers, 5 to 50 parts by weight of a polysiloxane having a siloxane structure of the following formulas (1) and (2):

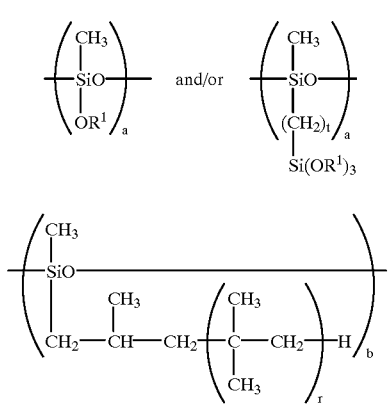

wherein $R^1$ is a $C_1$ to $C_6$ alkyl group or $C_1$ to $C_{21}$ acyl group, a is 1 to 200, b is 1 to 200, t is 2 or 3, and r is 1 to 100, formulated therein, and a softening agent and other rubber chemicals formulated therein.

5. A tire tread rubber composition as set forth in claim 4, wherein 20 to 60 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g and 5 to 50 parts by weight of at least one filler selected from the group consisting of silicas having a specific surface area by nitrogen adsorption ($N_2SA$) of 80 to 300 $m^2/g$ and a dibutyl phthalate oil absorption (DBP) of 100 to 300 ml/100 g are formulated.

6. A tire tread rubber composition comprising 100 parts by weight of at least one rubber selected from the group consisting of styrene-butadiene copolymer rubbers having a styrene content of at least 10% by weight and 60 to 100 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 70 to 140 ml/100 g or other fillers, 5 to 50 parts by weight of a polysiloxane according to claim 2 and a softening agent and other rubber chemicals formulated therein.

7. A tire tread rubber composition as set forth in claim 6, wherein 20 to 80 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 70 to 140 ml/100 g and 5 to 50 parts by weight of at least one filler selected from the group consisting of silicas having a specific surface area by nitrogen adsorption ($N_2SA$) of 80 to 300 $m^2/g$ and a dibutyl phthalate oil absorption (DBP) of 100 to 300 ml/100 g are formulated.

8. A rubber composition as set forth in claim 3, claim 5, or claim 7, wherein 2 to 150 parts by weight of a silica-containing polysiloxane master batch comprising 100 parts by weight of at least one ingredient selected from the group consisting of polysiloxanes having a siloxane structure of the following formulas (1) and (2):

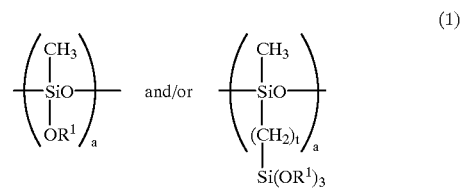

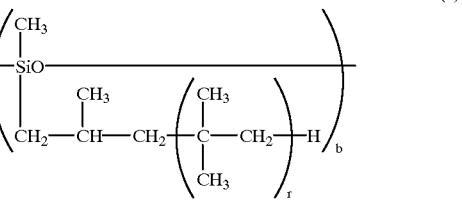

wherein $R^1$ is a $C_1$ to $C_6$ alkyl group or $C_1$ to $C_{21}$ acyl group, a is 1 to 200, b is 1 to 200, t is 2 or 3, and r is 1 to 100, containing 30 to 200 parts by weight of at least one filler selected from the group consisting of silicas having a specific surface area by nitrogen adsorption ($N_2SA$) of 80 to 300 $m^2/g$ and a dibutyl phthalate oil absorption (DBP) of 100 to 300 mil/100 g is formulated.

9. A rubber composition as set forth in claim 4 or claim 6, wherein 2 to 150 parts by weight of a carbon black-containing polysiloxane master batch comprising 100 parts by weight of at least one ingredient selected from the group consisting of polysiloxanes having a siloxane structure of the following formulas (1) and (2):

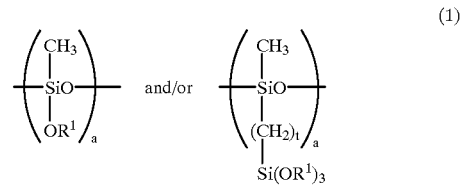

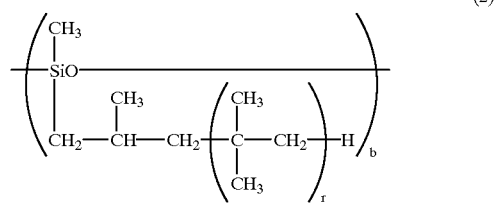

wherein $R^1$ is a $C_1$ to $C_6$ alkyl group or $C_1$ to $C_{21}$ acyl group, a is 1 to 200, b is 1 to 200, t is 2 or 3, and r is 1 to 100, containing 30 to 200 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g or other fillers is formulated.

10. A rubber composition as set forth in claim 3, claim 5, or claim 7, wherein 2 to 150 parts by weight of a silica- and carbon black-containing polysiloxane master batch comprising a mixture comprising 100 parts by weight of at least one ingredient selected from the group consisting of polysiloxanes having a siloxane structure of the following formulas (1) and (2):

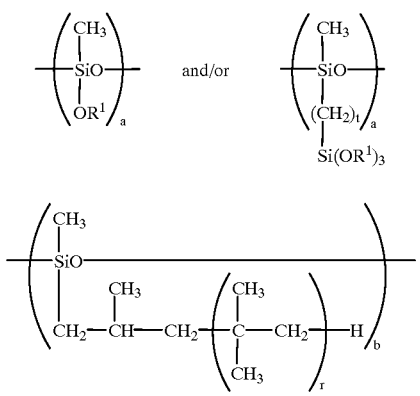

wherein $R^1$ is a $C_1$ to $C_6$ alkyl group or $C_1$ to $C_{21}$ acyl group, a is 1 to 200, b is 1 to 200, t is 2 or 3, and r is 1 to 100, containing 1 to 199 parts by weight of at least one filler selected from the group consisting of carbon blacks having a specific surface area by nitrogen adsorption ($N_2SA$) of 50 to 170 $m^2/g$ and a dibutyl phthalate oil absorption (DBP) of 60 to 140 ml/100 g or other fillers and 1 to 199 parts by weight of at least one filler selected from the group consisting of silicas having a specific surface area by nitrogen adsorption ($N_2SA$) of 80 to 300 $m^2/g$ and a dibutyl phthalate oil absorption (DBP) of 100 to 300 ml/100 g, wherein the sum of the two is 30 to 200 parts by weight, are formulated.

11. A rubber composition as set forth in claim 8, wherein 2 to 190 parts by weight of a master batch containing 0.5 to 40% by weight, based on the silica content contained in the silica-containing polysiloxane master batch or silica- and carbon black-containing polysiloxane master batch, of a silane coupling agent is formulated.

12. A rubber composition as set forth in claim 11, wherein 2 to 230 parts by weight of a master batch containing 0.05 to 30% by weight, based on the silane coupling agent content contained in the silica-containing polysiloxane master batch or silica- and carbon black-containing polysiloxane master batch, of a silanol condensation catalyst is formulated.

13. A tire tread rubber composition as set forth in claim 4, wherein a silane coupling agent is further formulated in an amount of 5 to 30% by weight, based on the amount of silica formulated.

14. A tire tread rubber composition as set forth in claim 13, wherein a silanol condensation catalyst is further formulated in an amount of 0.05 to 50% by weight, based on the amount of the silane coupling agent formulated.

15. A rubber composition as set forth in claim 10, wherein 2 to 190 parts by weight of a master batch containing 0.5 to 40% by weight, based on the silica content contained in the silica-containing polysiloxane master batch or silica- and carbon black-containing polysiloxane master batch, of a silane coupling agent is formulated.

16. A rubber composition as set forth in claim 15, wherein 2 to 230 parts by weight of a master batch containing 0.5 to 30% by weight, based on the silicane coupling agent content contained in the silica-containing polysiloxane master batch or silica- and carbon black-containing polysiloxane master batch, of a silanol condensation catalyst is formulated.

* * * * *